United States Patent [19]

Barrere et al.

[11] Patent Number: 5,715,518
[45] Date of Patent: Feb. 3, 1998

[54] ADAPTIVE WAVEFORM MATCHING FOR USE IN TRANSMITTER IDENTIFICATION

[75] Inventors: Wm. Gerrit Barrere, Kirkland; Dmitry Kaplan, Bellevue; Evan R. Green, Bothell, all of Wash.

[73] Assignee: Cellular Technical Services Company, Inc., Seattle, Wash.

[21] Appl. No.: 611,429

[22] Filed: Mar. 6, 1996

[51] Int. Cl.⁶ .............................. H04B 1/00; H04B 7/26
[52] U.S. Cl. ................... 455/49.1; 455/33.1; 455/54.1; 379/62; 340/825.34; 380/23
[58] Field of Search ........................... 455/33.1, 49.1, 455/54.1, 54.2, 56.1, 67.1, 103, 115; 379/58–60, 62; 340/825.31, 825.34; 380/21, 23

[56] References Cited

U.S. PATENT DOCUMENTS

| | | | |
|---|---|---|---|
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,390,245 | 2/1995 | Dent et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |
| 5,488,649 | 1/1996 | Schellinger | 379/62 |

(List continued on next page.)

*Primary Examiner*—Chi H. Pham
*Assistant Examiner*—Gertrude Arthur
*Attorney, Agent, or Firm*—Seed and Berry LLP

[57] ABSTRACT

A system and method extracts a portion of a transmitted waveform and compares the transmission characteristics of the extracted waveform to determine if they match a stored fingerprint associated with the transmitter, such as a cellular telephone. The system adaptively creates fingerprint data by storing a plurality of waveforms believed to be from a particular transmitter and calculates the variability of the individual transmissions with respect to a composite mean waveform of the transmission characteristics. The system emphasizes the variability between the individual waveforms and the composite mean waveform and determines variability values for each of the individual waveforms in the fingerprint. When the system receives an additional unidentified transmission purported to be from the transmitter with the stored fingerprint, the system determines whether the variability of the unidentified waveform fits within the predetermined margins of variability for the fingerprint. If the variability of the unidentified waveform is less than a predetermined variability threshold, the system considers the waveforms to be a suitable match. The system can adaptively include new waveforms in the fingerprint by determining whether the newly-received transmission characteristics meet a series of criteria for inclusion in the fingerprint. In addition, the system analyzes the newly-received waveform and all waveforms forming the fingerprint to determine if any of the waveforms exceed a predetermined maximum variability value. A waveform that exceeds the maximum variability value is eliminated from the fingerprint. The system is easily automated, thus providing a useful analysis technique for communications network such as cellular telephone systems where a large population of transmitters with similar transmission characteristics are operating at any given time.

83 Claims, 9 Drawing Sheets

U.S. PATENT DOCUMENTS

| | | | |
|---|---|---|---|
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,537,474 | 7/1996 | Brown et al. | 380/23 |
| 5,541,977 | 7/1996 | Hodges et al. | 379/58 |
| 5,551,073 | 8/1996 | Sammarco | 455/89 |
| 5,555,551 | 9/1996 | Rudokas et al. | 379/59 |

ADAPTIVE WAVEFORM MATCHING FOR USE IN TRANSMITTER IDENTIFICATION

TECHNICAL FIELD

The present invention relates generally to a system and method for transmitter identification, and more particularly, to a system and method for identifying a particular transmitter from a large group of similar transmitters.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each transmitter. When a particular cellular telephone wishes to place a phone call, the individual subscriber or other authorized user dials in a telephone number and presses the "Send" button. In response, the cellular telephone transmits its ESN and MIN to the cellular network so the individual subscriber can be charged for the telephone call.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the telephone, and then programmed into another telephone for illegal use. Thus, the mere transmission of the authentic ESN and MIN are inadequate to protect a cellular telephone system from misuse by counterfeiters.

In an effort to provide additional security, some cellular systems and other wireless services, authenticate mobile units based on the transmission of digital data by the mobile unit during a call set-up process. Rather than identify the mobile unit by its ESN and MIN alone, the system identifies a mobile unit by its transmission characteristics. In this manner, the cellular system operator can reject calls from illegitimate mobile units even when those mobile units transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While these characteristics can be used to identify an individual transmitter type, the technology is limited in its ability to distinguish individual transmitters in a population of hundreds of thousands of transmitters of the same type that have very similar characteristics. The statistical performance of these transmitter identification techniques is inadequate for use in authentication systems where each of a very large number of transmitters must be uniquely identified. In addition, an individual transmitter does not have exactly the same transient response each time the transmitter is activated. The techniques presently known in the art are unable to distinguish between variations of the same transmitter and different transmitters when all of the transmitters are similar in design.

These transmission characteristics may be analyzed and visually authenticated by human beings. However, such analysis cannot be done in real-time. This is a distinct disadvantage in a system where thousands of transmissions must be analyzed each hour. Furthermore, many waveforms may appear quite similar to the human eye and thus require painstaking analysis to distinguish among individual transmitters. For these reasons, a manual analysis is ineffective to uniquely identify one transmitter in a large population of transmitters transmitting over a network, such as a cellular telephone network.

The system described in the Ferrell patent discusses pattern recognition techniques to automatically compare two waveforms. The comparison of one reference waveform against a real-time transmission event limits the transmitter identification process and thus the ability to uniquely identify one transmitter in a large population of transmitters. In addition, the conventional approach to transmitter identification must establish the reference waveform for comparison either manually or with a single verification technique for determining that the reference waveform is that of the known valid transmitter. The manual method is both tedious and impractical when applied to hundreds of thousands or millions of transmitters. The single verification technique is prone to error if the verification is dependent on data records that have been manually entered by humans.

In the Ferrell patent, parameters such as the transient response of the transmitter carrier can be used to identify the individual transmitter. It is also known in the art that the comparison of the measured waveform to the reference waveform may be determined statistically. However, the conventional statistical analysis, such as the comparison of mean values, is ineffective for uniquely identifying a single transmitter in a large population of transmitters.

Therefore it can be appreciated that there is a significant need for a system and method that will automatically permit the identification of a single transmitter in a very large population of transmitters. The present invention provides this and other advantages as will be illustrated by the following description and accompanying figures.

SUMMARY OF THE INVENTION

The present invention is embodied in a system for the identification of an individual transmitter operating in an environment containing a plurality of similar transmitters as either an authentic transmitter or an unauthorized transmitter. The system establishes a reference fingerprint by collecting and storing a plurality of response waveforms designated as reference waveforms for the authentic transmitter. A mean processor computes individual normalized waveforms for each of the reference waveforms and also computes a composite mean waveform using the individual normalized waveforms. A waveform processor computes difference waveforms between each of the individual normalized waveforms and the composite mean waveform. The waveform processor applies an exponential weighting function to each of the difference waveforms to generate a variability value for each of the individual reference waveforms, the variability values indicating the variability of each of the individual reference waveforms from the composite mean waveform.

The waveform processor can sum each of the exponentially-weighted data points of the difference waveform to generate the variability value for each of the individual reference waveforms. The system can further include a statistical analyzer to compute a statistical measure of the variability values for each of the individual reference waveforms. In one embodiment, the statistical analyzer calculates a mean variability value for the variability values of each of the individual reference waveforms and a standard deviation of the variability values for each of the individual reference waveforms.

The system can utilize the stored reference data associated with the authentic transmitter to authenticate an individual transmitter which transmits identification data identifying it as the authentic transmitter and in addition, transmits a first unauthenticated response signal. A receiver circuit receives the transmission from the unauthenticated transmitter. The mean processor computes a first unauthenticated response normalized waveform from the first unauthenticated response signal. The waveform processor computes difference waveforms between the first unauthenticated normalized waveform and the composite mean waveform. The waveform processor applies the weighting function to each of the difference waveforms and generates a first unauthenticated variability value for the first unauthenticated normalized waveform. The first unauthenticated variability value indicates the variability of the first unauthenticated normalized waveform from the composite mean waveform. The system further includes a comparison processor which compares the first unauthenticated response variability value to the statistical values related to the reference waveforms and the composite mean waveform to determine whether the unauthenticated transmitter is the authentic transmitter or the unauthorized transmitter.

In one embodiment, the comparison processor calculates a confidence value indicative of the level of confidence with which the unauthenticated transmitter is identified as the authentic transmitter. The confidence value can have the following form:

$$CV = \frac{V_U - \overline{V}}{\sigma_U}$$

where CV is the confidence value, $V_U$ is the first unauthenticated response variability value, $\overline{V}$ is a mean variability value of the variability values for each of the individual reference waveforms, and $\sigma_U$ is a standard deviation of the variability values for each of the individual reference waveforms.

The comparison processor can generate an indication that the unauthenticated transmitter is the authentic transmitter if the confidence value is less than or equal to a predetermined threshold. In one embodiment, the predetermined threshold is set between 2-3.

The system may further include a normalizer processor as part of the mean processor which receives each of the reference waveforms and normalizes each of the reference waveforms with respect to itself by subtracting its mean value. The normalizer processor also receives and normalizes the first unauthenticated response signal.

The system may also include an alignment processor to temporally align the reference waveforms when the reference waveforms have a response start as a function of time. In this embodiment, the data storage area stores the temporally aligned reference waveforms. The alignment processor also temporally aligns the first unauthenticated response signal with the composite mean waveform. The mean processor and waveform processor perform subsequent analysis and processing of the temporally aligned reference waveforms and first unauthenticated response signal.

In one embodiment, the first transient response is a transmitter turn-on transient. Alternatively, the first unauthenticated response signal is a transmitter turn-off transient. The system can also analyze a second unauthenticated response signal. The transmission received by the receiver circuit includes both first and second unauthenticated response signals. In this embodiment, the mean processor computes a second unauthenticated response normalized waveform from the second unauthenticated response signal. The waveform processor computes second unauthenticated difference waveforms between the second unauthenticated normalized waveform and the composite mean waveform and applies the weighting function to the second unauthenticated difference waveform. The waveform processor thus generates a second unauthenticated variability value. The comparison processor compares the first and second response variability values to the statistical values related to the composite mean waveform to determine whether the unauthenticated transmitter is the authentic transmitter or an unauthorized transmitter.

In one embodiment, the weighting function applied by the waveform processor raises each of the data points of the difference waveform to an exponential value greater than 1. In a preferred embodiment, the difference values are raised to the power of 1.2. The system may further include a look-up table having an index input corresponding to the range of difference values and stored values corresponding to the difference values after application of the weighting function.

The system further includes a modification processor to alter the stored reference data. The modification processor analyzes the first unauthenticated response signal and the individual reference waveforms and includes the first unauthenticated response signal as an additional one of the reference waveforms only if the first unauthenticated response signal has a predefined acceptable characteristic. The radio transmission from the unauthenticated transmitter has a received signal strength and a signal strength variability. The modification processor analyzes the received signal strength and signal strength variability as the acceptable characteristics. The modification processor will include the first unauthenticated response as the additional one of the reference waveforms only if the received signal strength is above a predetermined signal threshold and the signal strength variability is below a predetermined variability threshold. The modification processor also removes one of the reference waveforms if the confidence value for that particular reference waveform exceeds a maximum confidence value for the number of stored reference waveforms.

DETAILED DESCRIPTION OF THE INVENTION

Although the present invention can be used to compare any two waveforms, it is particularly applicable to the automatic identification of waveforms used to identify individual transmitters in a cellular telephone system. As discussed in the background section, conventional techniques are incapable of real-time identification of a particular transmitter (cellular telephone) in a population of tens or hundreds of thousands of transmitters having similar operational characteristics.

Figure 1:
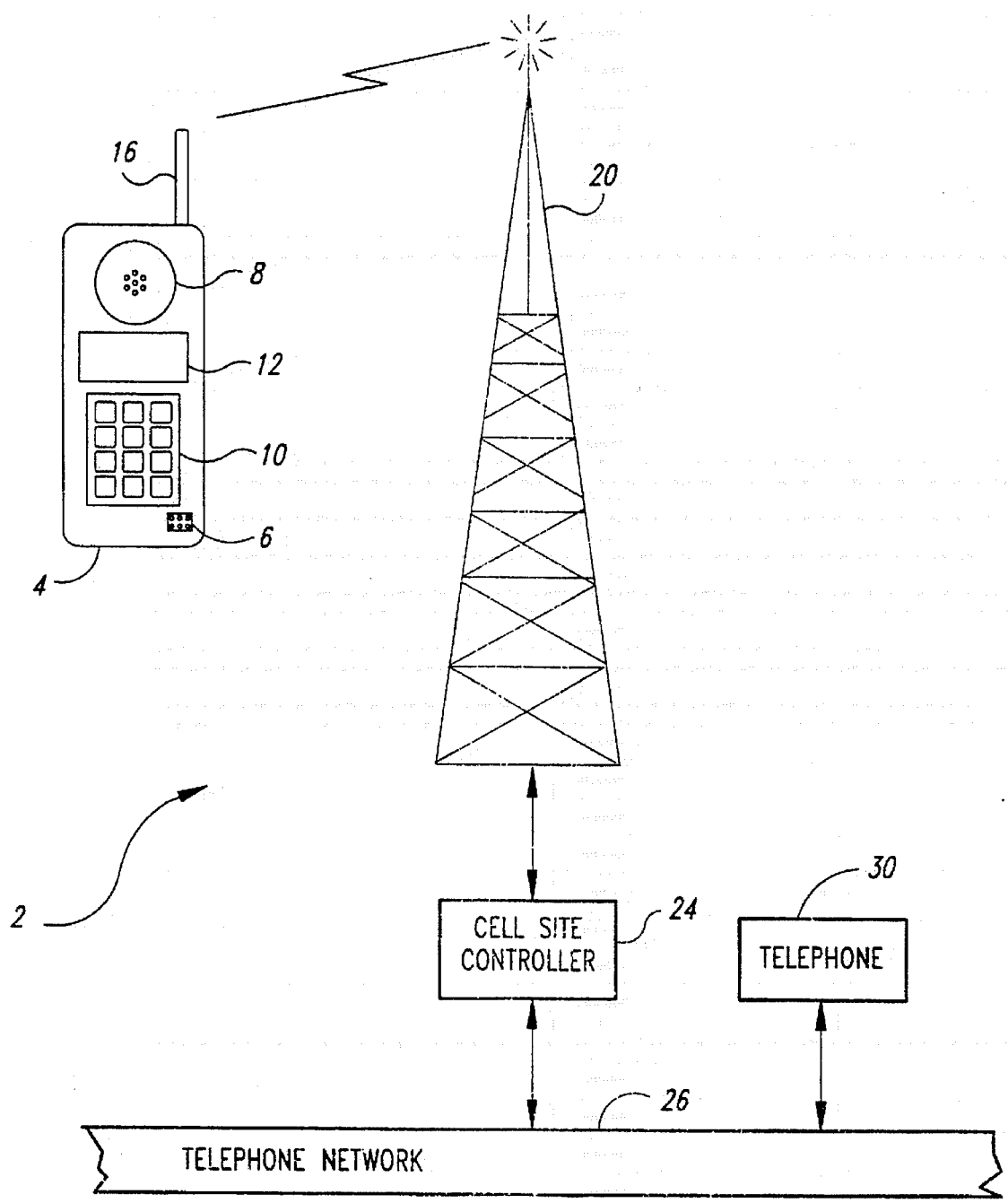
FIG. 1 illustrates the operation of a conventional cellular telephone system.

A conventional cellular telephone system 2 is illustrated in FIG. 1. An individual cellular telephone (cell phone) 4 has a microphone 6 and a speaker 8, as well as a keypad 10 and display 12. Transmitter and receiver circuits (not shown) within the cell phone 4 communicate via an antenna 16 to a cell site antenna 20 at a frequency typically in the 800 megahertz (MHz) frequency range. The signal received by the cell site antenna 20 is coupled to a cell site controller 24. The cell site controller 24 determines the authenticity of the ESN and MIN, as well as the telephone number being called by the cell phone 4. The cell site controller 24 couples the cell phone 4 to a conventional telephone network 26. Also coupled to the telephone network 26 is a telephone 30 to which the cell phone 4 is placing a call. In this manner, the cell phone 4 can communicate with the telephone 30. Similarly, the telephone 30 may place a call to the cell phone 4 in the reverse manner described above. The telephone 30 is illustrated in FIG. 1 as connected directly to the telephone network 26. However, those skilled in the art will recognize that the telephone 30 could be another cellular telephone coupled to the cell site controller 24 by the cell site antenna 20, or another cell site controller and antenna (not shown).

Figure 2:
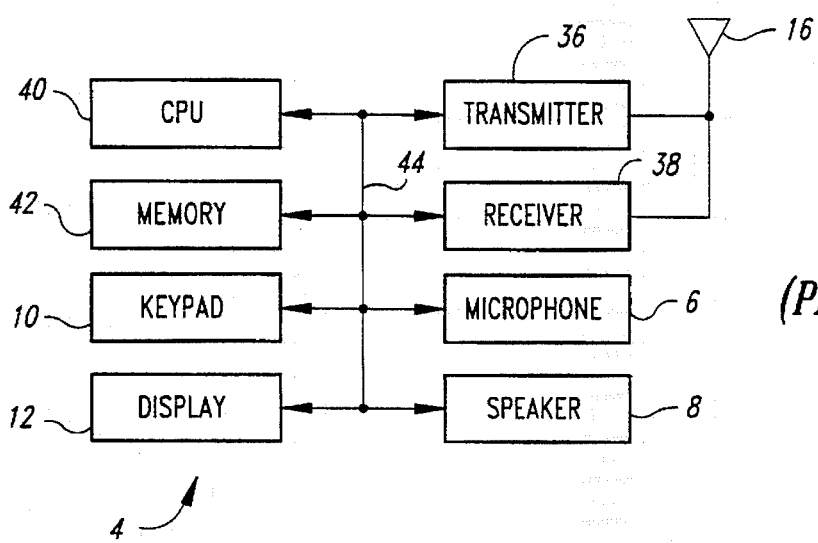
FIG. 2 is a functional block diagram of one of the conventional cellular telephones of FIG. 1.

The conventional cell phone 4 is illustrated in the functional block diagram of FIG. 2. The antenna 16 is coupled to a transmitter 36 and a receiver 38. The microphone 6, speaker 8, keypad 10, and display 12 are conventional components that need not be described in any greater detail. The cell phone 4 also includes a central processing unit (CPU) 40, which may be an embedded controller, conventional microprocessor, or the like. In addition, the cell phone 4 includes a memory 42, which may include both random access memory (RAM) and read-only memory (ROM). For the sake of clarity, other conventional components, such as a power supply, have been omitted. The various components described above are coupled together by a bus 44. For the sake of clarity, the bus 44 is illustrated as coupling all components together. However, those skilled in the art will recognize that some components, such as the microphone 6 and speaker 8, are analog components while the CPU 40 and memory 42 are digital components. Thus, the bus 44 includes both analog and digital portions (not shown). The operation of the cell phone 4 is well known in the art and thus will only be described in the context of the present invention.

The cell phone 4 communicates with the cell site controller 24 (see FIG. 1) using a control channel having a predetermined frequency for the cell site and a voice channel having a frequency designated by the cell site controller 24 for the particular call being placed. Initial communications between the cell phone 4 and the cell site controller 24 occur using only the control channel. The cell phone 4 transmits the ESN and MIN to the cell site controller 24 over the control channel. In addition, the dialed telephone number is also transmitted from the cell phone 4 to the cell site controller 24 over the control channel. The control channel transmits and receives digital data using frequency-shift keying (FSK) of 10 Kbaud Manchester-encoded data.

Figure 3:
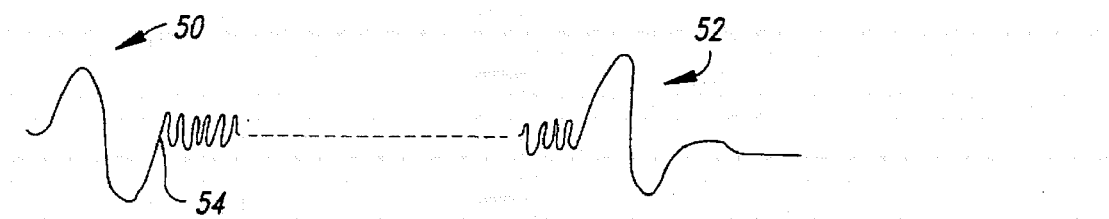
FIG. 3 is a waveform illustrating transmission characteristics of the transmitter of the cellular telephone of FIG. 2.

A typical waveform on the control channel is illustrated in FIG. 3. When the user first presses the "Send" button on the keypad 10 (see FIG. 2), the transmitter 36 modulates the FSK data to the predetermined control frequency in the 800 MHz band. When the transmitter 36 is first activated, it must lock onto the appropriate radio frequency (RF) for the particular control channel. The process of locking onto the selected control channel frequency generates a turn-on transient, which is designated herein as a phase history transient 50. It should be noted that the waveform illustrated in FIG. 3 is not the RF signal itself, but rather an example of the demodulated output received at the cell site controller 24. In addition to the phase history transient 50, the cell phone 4 generates a turn-off transient 52, designated herein as a tail. The tail transient 52 results from the turn-off transient response of the transmitter 36 (see FIG. 2). The present invention is capable of characterizing one or both of the phase history transient 50 and the tail transient 52 of an individual cell phone transmitter 36 to determine if the cell phone 4 is authentic, or a pirate cell phone fraudulently transmitting an authentic ESN and MIN of the transmitter of a valid subscriber. Alternatively, the system can analyze other transmission characteristics such as a transient response 54 of the FSK data. Thus, the present invention analyzes individual transmission characteristics of the transmitter 36 to uniquely authenticate each cell phone in a population of tens or hundreds of thousands of cell phones.

The phase history transient 50 and tail transient 52, shown in FIG. 3, represent one transmission from the cell phone 4 to the cell site controller 24. However, the phase history transient 50 and tail transient 52 can vary from one transmission to another due to variations in a number of parameters. For example, the strength and variability of the signal transmitted from the cell phone 4 to the cell site controller 24 can vary from one transmission to another thus affecting the characteristics of the phase history transient 50 and the tail transient 52. Environmental factors, such as temperature, presence or absence of interfering electrical noise, solar flares, and the like, can affect the length and shape of the phase history transient 50 and tail transient 52. In addition, the characteristic of the phase history transient 50 and tail transient 52 can change over time as the components of the cell phone 4 age. Thus, it is ineffective to compare a signal from an unidentified transmitter with a single reference waveform to determine whether the unidentified transmitter matches the characteristics of the cell phone 4 having the corresponding ESN and MIN.

For purposes of the following discussion, the cell phone 4 is considered to be a valid cell phone having a predetermined ESN and MIN. When a new call is transmitted to the cell site controller 24, it transmits the predetermined ESN and/or MIN corresponding to the cell phone 4 and is thus identified to the cell site controller. However, the new call is considered to be unauthenticated because it could be transmitted from the cell phone 4 or an illegal cell phone (not shown) that is illegally transmitting a false ESN and MIN. The present invention analyzes the transmission characteristics of the unauthenticated cell phone to determine if the transmission characteristics match the stored transmission characteristics corresponding to the transmitted identification.

Instead of a single waveform, and a simple waveform comparison algorithm, the present invention develops a "fingerprint" for each cell phone 4 and matches the characteristic waveform of the unauthenticated cell phone with the fingerprint corresponding to the identification code (e.g., the ESN or the MIN) transmitted to the cell site controller 24. The fingerprint comprises a series of stored "fingerprint" waveforms believed to be from a particular transmitter and statistical data relating to the stored waveforms. The fingerprint is stored in association with a transmitter identification such as the ESN, the MIN, or other unique identifier for that transmitter. The analogy with fingerprints is used because each fingerprint is believed to be completely unique. The fingerprint of the present invention can be used to automatically determine whether the transmission characteristics of an unknown transmitter match the stored fingerprint corresponding to the transmitted ESN and MIN. The present system can accommodate the variations in characteristic waveforms such as those caused by the factors described above. Thus, the system of the present invention can accommodate variations in the transmitter characteristics and emphasize differences between the transmission characteristics of the unidentified transmitter and the stored fingerprint. The present invention is also capable of operation in real-time thus permitting the automatic verification of each cell phone based on its transmission characteristics. Furthermore, the present invention is adaptive and capable of updating the fingerprint to accommodate changes in the cell phone transmission characteristics over time.

The present invention includes the different inventive operations: (1) the establishment of a fingerprint for the cell phone 4; (2) the comparison of the transmission characteristics of the unauthenticated cell phone with the fingerprint; and (3) the modification of the fingerprint. The initial establishment of the fingerprint (operation number 1) is performed prior to authenticating any unauthenticated telephone calls. For example, the cell phone 4 can be used to place calls to a designated telephone number at the cell site controller 24 when the cell phone is first programmed for use by the retail cell phone sales outlet. Operation number 2 involves the authentication of subsequent cell phone calls by comparing the transmission characteristics to the stored fingerprint. This operation must be performed in real time to permit authenticated calls to proceed and to terminate fraudulent calls. The modification of the fingerprint (operation number 3) can be done in real time after the authentication process is complete. Alternatively, the fingerprint modification can occur at a later time, such as at the end of the day, when call volume has decreased. This alternative approach can be used to reduce the real time processing workload performed by the system.

Figure 4:
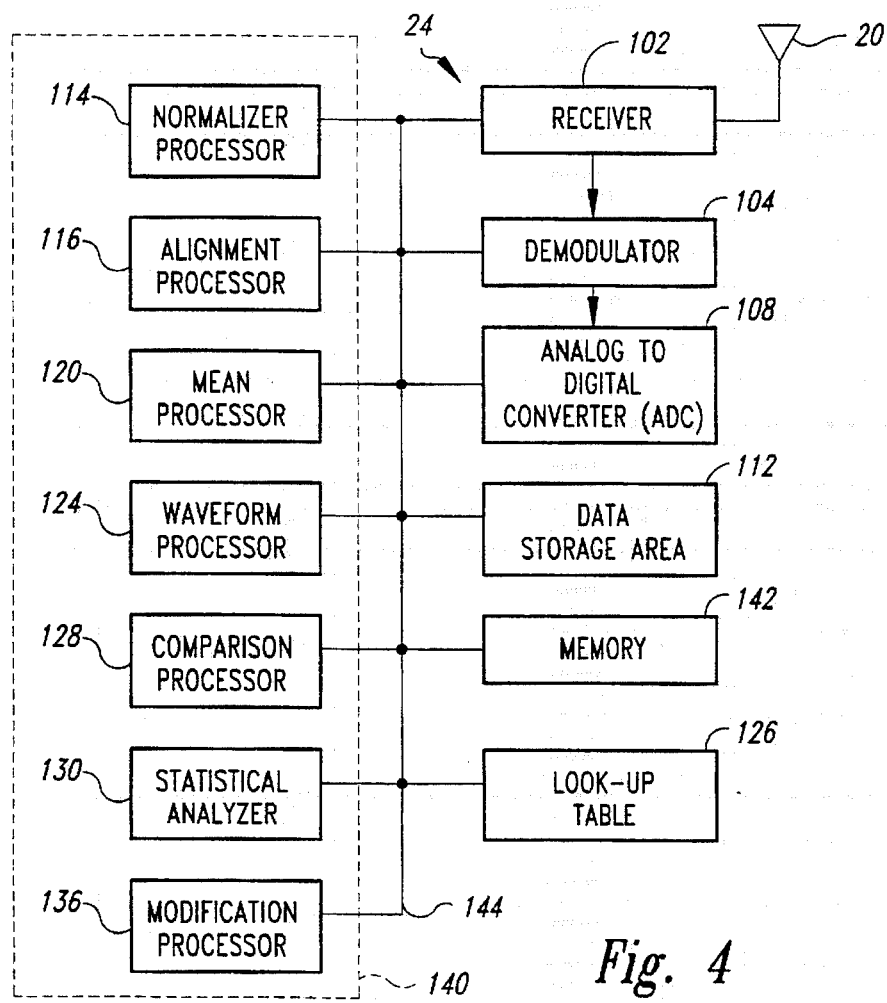
FIG. 4 is a functional block diagram of the system of the present invention.

The present invention is embodied in a system 100 illustrated in the functional block diagram of FIG. 4. A receiver 102 in the cell site controller 24 is coupled to the cell site antenna 20 in a conventional manner. A demodulator 104 is coupled to the receiver 102 to demodulate the RF signal received from the cell phone 4 (see FIG. 2). The output of the demodulator 104 is a waveform similar to that illustrated in FIG. 3. An analog-to-digital converter (ADC) 108 converts the demodulator output into a digitized waveform. The output of the ADC 108 is a digitized version of the waveform illustrated in FIG. 3. Each time an unauthenticated cell phone 4 transmits to the cell site controller 24, the transmission characteristic waveform generated by the ADC 108 is compared with the stored fingerprint for the ESN or MIN transmitted by the unidentified cell phone. The fingerprint, which will be described in detail below, is stored in a data storage area 112. The data storage area 112 may be any conventional mass storage unit, such as a computer disk drive.

The desired transmission characteristic, such as the phase history transient 50 or the tail transient 52, can be extracted from the transmission in a conventional manner. The receiver 102 receives a "Received Signal Strength Indicator" (RSSI) indicative of the strength of the signal received from the cell phone 4 (see FIG. 2). In the presently preferred embodiment, the system 100 looks for an increase in the RSSI, and defines that time as the start of the phase history transient 50. When data transmission begins, using the FSK modulation described above, the system defines that point as the end of the phase history transient 50. Similar start and stop points may be defined for the tail transient 52 or other transmission characteristic. It should be noted that the precise points in time that are defined as the start and stop of the transmission characteristic are not as critical as is the consistency in collecting data using the selected starting and stopping points.

A variety of processors analyze the stored fingerprint waveforms to initially generate the fingerprint, and analyze the characteristic waveform from the ADC 108 to determine whether the transmission characteristics of the unauthenticated cell phone match the fingerprint corresponding to the transmitted ESN and MIN. However, unlike conventional waveform comparison algorithms, the present system determines whether the variability of the unauthenticated characteristic waveform is statistically consistent with the variability of the stored fingerprint waveforms.

A normalizer processor 114 is used to normalize waveforms digitized by the ADC 108. An alignment processor 116 performs a temporal shift of one or more digitized, normalized waveforms. A mean processor 120 calculates a composite mean waveform. A waveform processor 124 performs mathematical computations on the individual fingerprint waveforms and the composite mean waveform. The processed fingerprint waveforms are stored in the data storage area 112.

The normalizer processor 114, alignment processor 116, mean processor 120, and waveform processor 124 perform a similar analysis of the transmitted characteristic waveform from the unauthenticated cell phone. A comparison processor 128 performs an analysis of the processed characteristic waveforms from the unauthenticated cell phone with the fingerprint stored in the data storage area 112. The comparison processor 128 compares the processed transmission characteristics from the unauthenticated cell phone with the fingerprint stored in the data storage area 112. A statistical analyzer 130 is used to determine statistical measures of both the fingerprint waveforms and the processed transmission characteristics from the unauthenticated cell phone. The comparison processor 128 uses the statistical values to determine whether the unauthenticated cell phone is an acceptable match to the stored fingerprint. If so, the cell phone 4 is considered to be authenticated.

If the transmission characteristic from the cell phone 4 has been authenticated, a modification processor 136 analyzes the transmission characteristic to determine whether or not it should be added to the fingerprint in the data storage area 112 to be used for future identification purposes.

It should be noted that in a typical application, the functions performed by the normalizer processor 114, alignment processor 116, mean processor 120, waveform processor 124, comparison processor 128, statistical analyzer 130, and modification processor 136 are performed by a single computer or microprocessor 140, indicated by the dashed line box of FIG. 4. However, those skilled in the art can appreciate that one or more of these functions can be provided by different computers coupled together by conventional means, such as a network connection. The present invention is not limited by the specific hardware configuration used to perform these functions.

The system 100 also includes a memory 142 which may include both RAM and ROM. The memory 142 is used by the microprocessor 140 to store data and calculations. The look-up table 126 may be part of the memory 142. The various components described above are coupled together by a bus 144. As those skilled in the art can appreciate, some components, such as the receiver 102 and demodulator 104, are analog components while the components of the microprocessor 140, memory 142, and the like require digitized signals. However, for the sake of clarity, the bus 144 simply illustrates the connections between the various components. Those skilled in the art can appreciate that the bus 144 represents both analog and digital connections between components. The operation of the system 100 may now be described.

Figure 5A:
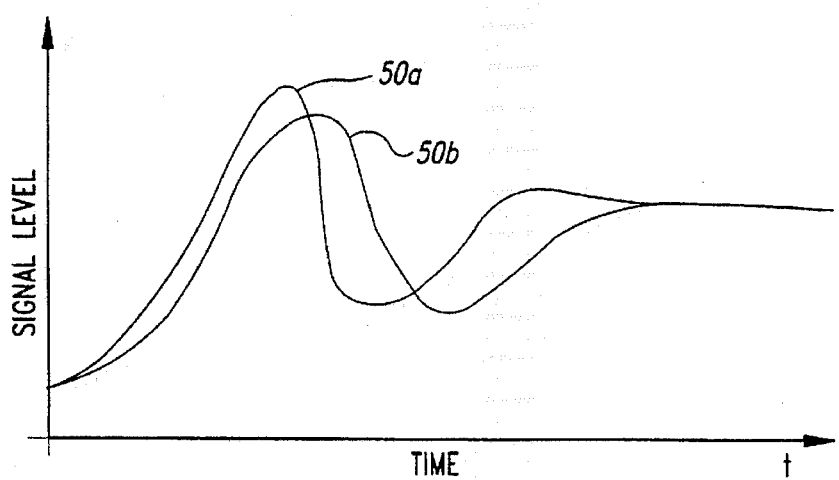
FIG. 5A are waveforms illustrating the temporal relation of transient response waveforms of FIG. 3.

The fingerprint is initially computed (operation number 1) by a number of steps that will now be described in detail. The system 100 first gathers a number of characteristic waveforms that have been identified as being from a particular authentic cell phone 4. These waveforms are designated as fingerprint or reference waveforms. In the presently preferred embodiment, up to ten fingerprint waveforms are collected to generate the fingerprint. Each of the fingerprint waveforms is digitized by the ADC 108 to generate digitized waveforms. The normalizer processor 114 normalizes each of the digitized fingerprint waveforms with respect to itself. That is, a mean for each of the individual fingerprint waveforms is calculated and subtracted from that individual fingerprint waveform. This has the effect of eliminating any DC component in each fingerprint waveform. The alignment processor 116 receives the normalized waveforms from the normalizer 114 and aligns the ten normalized fingerprint waveforms in time. As can be readily understood by those of ordinary skill in the art, the transmission characteristics, such as the phase history transient 50 in the fingerprint waveforms, can have a similar shape, but be slightly offset in time from one telephone call to the next. This effect is illustrated in FIG. 5A where two examples of the fingerprint waveforms, designated as 50a and 50b, are slightly offset in time. The fingerprint waveforms 50a and 50b may be from two telephone calls in quick succession or spaced far apart in time. The time offset of FIG. 5A merely illustrates the known principle that the transient response of the transmitter 36 (see FIG. 2) is almost never precisely identical from one telephone call to the next. The alignment processor 116 shifts the fingerprint waveforms 50a and 50b of the fingerprint waveforms with respect to one another to determine the best temporal alignment.

Figure 5B:
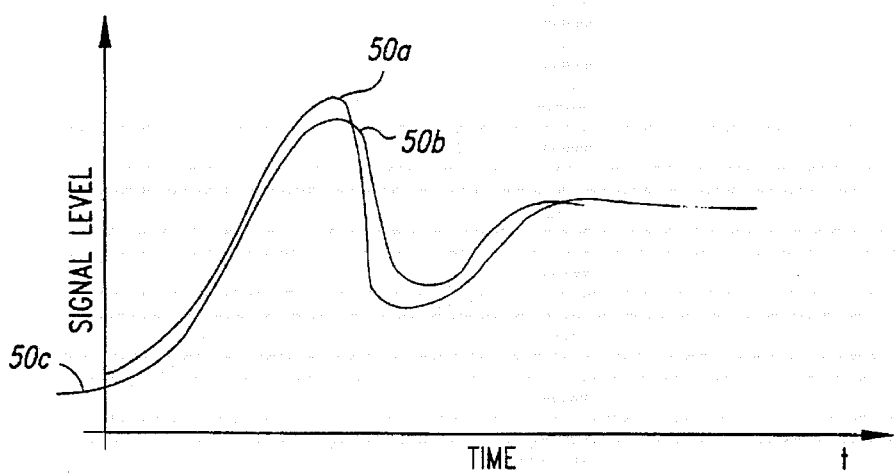
FIG. 5B illustrate the temporal shifting of the waveforms of FIG. 5A.

There are a number of known techniques for aligning the fingerprint waveforms in time. In the presently preferred embodiment, the system 100 aligns two fingerprint waveforms by shifting them with respect to one another and subtracting one fingerprint waveform from the other until a minimum waveform is produced. In the example illustrated in FIG. 5A, the alignment processor 116 shifts the fingerprint 50b to the left one bit at a time with respect to the fingerprint waveform 50a and subtracts one fingerprint waveform from the other to determine the best temporal alignment. FIG. 5B illustrates the fingerprint waveforms 50a and 50b following temporal alignment. The alignment processor 116 attempts to align the fingerprint waveforms 50a and 50b so that the waveforms have good overall alignment. It should be noted that the user can designate a maximum temporal shift that would be allowed before declaring that the two fingerprint waveforms cannot be aligned in time. This prevents the accidental alignment of unrelated portions of the fingerprint waveforms 50a and 50b.

The alignment processor 116 also determines where the fingerprint waveforms overlap. The system 100 only analyzes overlapping portions of the fingerprint waveforms. As illustrated in FIG. 5B, a portion 50c of the fingerprint waveform 50b does not overlap the fingerprint waveform 50a due to the temporal alignment process. Thus, the portion 50c will not be included in the fingerprint generation process by the system 100.

The mean processor 120 receives the normalized and aligned fingerprint waveforms from the alignment processor 116 and generates a composite mean waveform, designated herein as M, which is the composite mean waveform of all the fingerprint waveforms.

The composite mean waveform M can be generated by adding the values of each corresponding data point in each of the normalized fingerprint waveforms and dividing this sum by the number N of fingerprint waveforms used in the analysis. For example, if the corresponding data points in three fingerprint waveforms were 10, 11, and 11, respectively, the mean value for that particular data point is 10.66 (i.e., (10+11+11)/3). The composite mean waveform M is normalized with respect to itself by calculating a mean value for the composite mean waveform M and subtracting the mean value from each data point in the composite mean waveform M.

In addition to generating the composite mean waveform M, the mean processor 120 generates individual normalized waveforms for each of the fingerprint waveforms by subtracting the mean value of the waveform from each data point in the waveform. Thus, the mean processor 120 generates the composite mean waveform M and individual normalized waveforms for each of the fingerprint waveforms. As discussed above, the system 100 only analyzes overlapping portions of the fingerprint waveforms. Therefore, the composite mean waveform M and individual normalized fingerprint waveforms are generated only for those overlapping portions of the fingerprint waveforms.

The system 100 includes the waveform processor 124 to further process the individual normalized fingerprint waveforms. The waveform processor 124 calculates the difference between each data point in the individual normalized fingerprint waveforms and the corresponding data point in the composite mean waveform M. The waveform processor 124 raises each difference value to an exponential power, thus emphasizing differences between the individual normalized fingerprint waveforms from the composite mean waveform M. The difference waveforms are designated herein as $\overline{F}_1$ to $\overline{F}_{10}$ for an example using ten fingerprint waveforms $\overline{F}_1$ to $\overline{F}_{10}$. However, the system 100 can operate with more or fewer fingerprint waveforms. In addition to emphasizing differences between the individual normalized fingerprint waveforms and the composite mean waveform M, the application of an exponential power to each data point has the effect of de-emphasizing small differences between the individual normalized fingerprint waveforms and the composite mean waveform M that may be caused by noise.

Each of the difference values in the difference waveforms $\overline{F}_1$ to $\overline{F}_{10}$ to is raised to the exponential power, then summed by the waveform processor 124 to generate a variability value indicating the variability of each of the individual normalized waveforms from the composite mean waveform M. The system 100 determines whether the variability of the unauthenticated transmission characteristic is consistent with the variability of the fingerprint. The analysis performed by the system 100 can be expressed by the following equation:

$$V_j = \frac{\sum_{i=1}^{Z} [\overline{F}i,j]^{1.2}}{Z} \quad (1)$$

where V is the variability value for the jth fingerprint waveform, and $\overline{F}_{i,j}$ is the difference value for the ith data point in the jth fingerprint waveform (i.e., the difference between the ith data point of the jth fingerprint waveform and the ith data point in the composite mean waveform M), and Z is the number of data points in the waveform. In the presently preferred embodiment, the difference values $\overline{F}_{i,j}$ are raised to the power of 1.2. However, as will be discussed in detail below, other weighting functions may also be used by the system 100. While the waveform processor 124 can compute these exponential values mathematically, the system 100 includes a look-up table 126 to perform this function. The look-up table 126 stores data values corresponding to the exponential output values, while the inputs to the data look-up table correspond to the expected range of values for the difference waveforms $\overline{F}_1$ to $\overline{F}_{10}$. Thus, the system 100 does not merely compare the transmission characteristics of the unauthenticated cell phone with the composite mean waveform, but also considers the variability of fingerprint waveforms from the cell phone 4 from the composite mean waveform.

The statistical analyzer 130 can perform conventional statistical analysis of the fingerprint data. The waveform processor 124 sums up all the data values for each of the difference waveforms $\overline{F}_1$ to $\overline{F}_{10}$ raised to the exponential power and divides by Z, the number of data points in the waveform. The resultant variability values $V_1$ to $V_{10}$ provide an indication of the variability of each of the fingerprint waveforms from the composite mean waveform M. The statistical analyzer 130 computes the mean and standard deviation of the variability values $V_1$ to $V_{10}$.

Figure 6A:
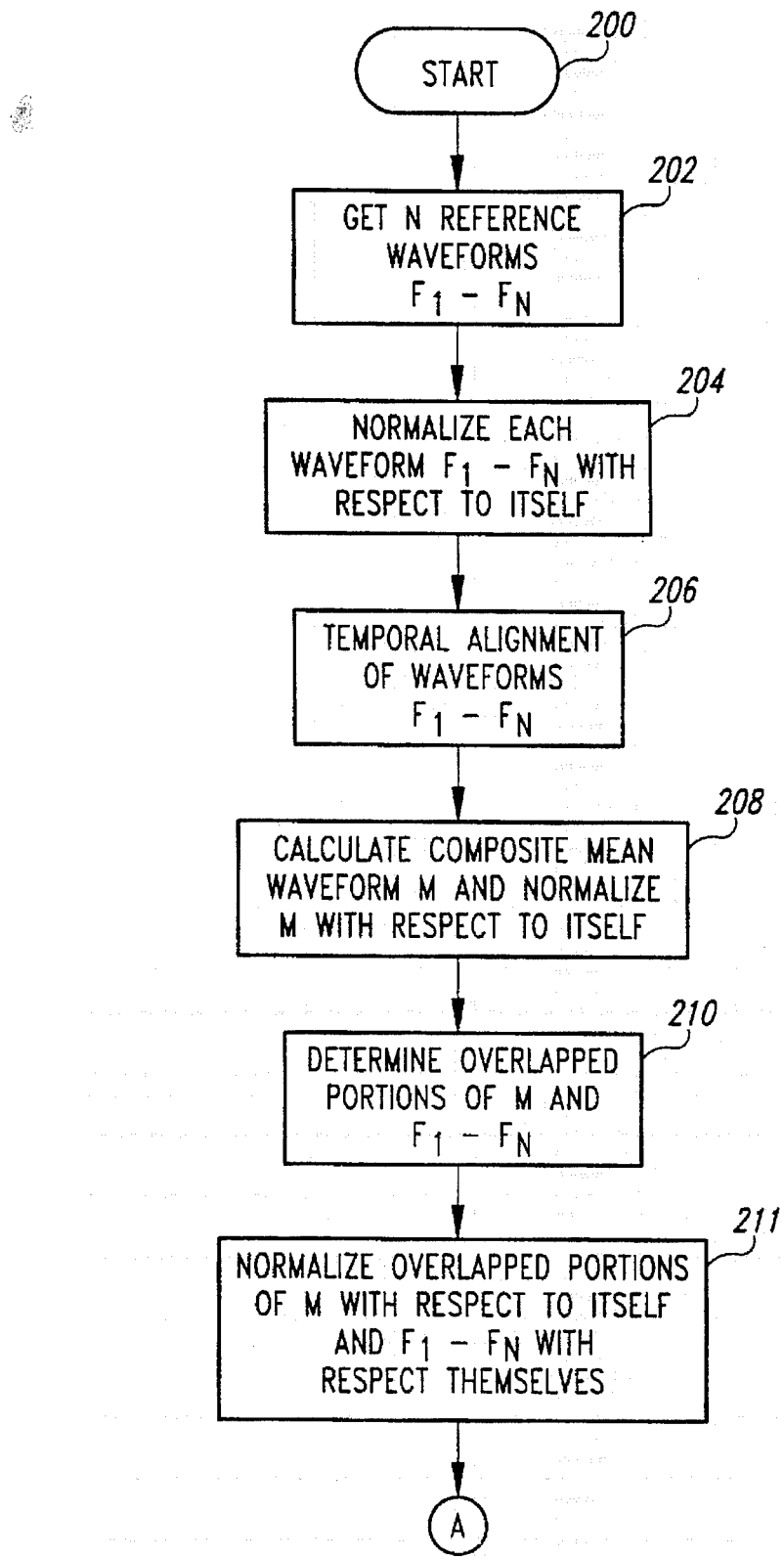
FIGS. 6A and 6B together are flowcharts of the operation of the system of FIG. 4 to assemble a fingerprint data file for an individual cellular telephone transmitter.
Figure 6B:
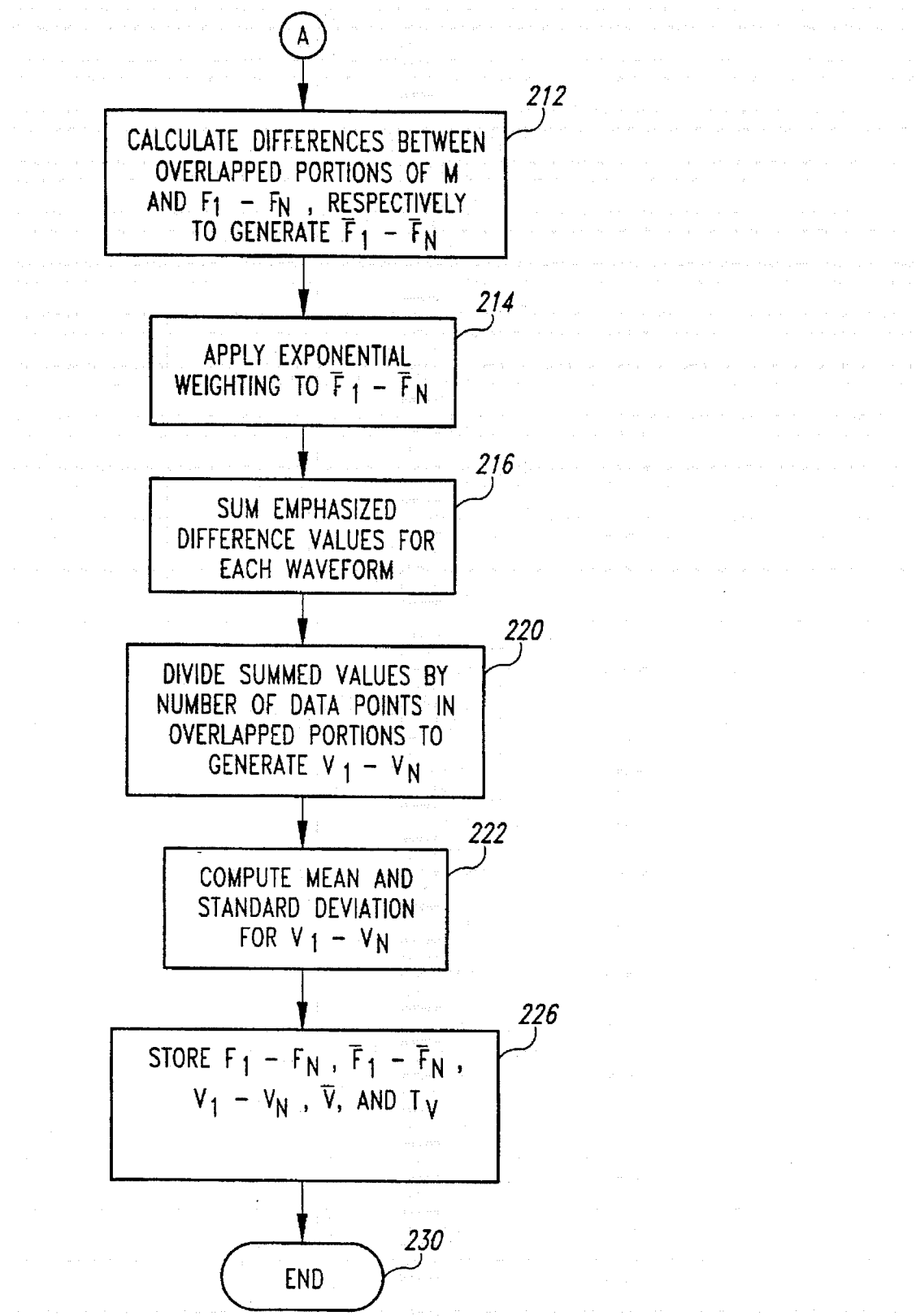

The operation of the system 100 to initially generate a stored fingerprint (operation number 1) is illustrated in the flowcharts of FIGS. 6A and 6B. At the start 200, the system 100 has no fingerprint waveforms stored for a particular cellular telephone. In step 202, the system 100 obtains N fingerprint waveforms $F_1$ to $F_N$ from the cell phone 4. The N fingerprint waveforms $F_1$ to $F_N$ can be obtained in the manner described above where N telephone calls are placed from the cell phone 4 to the predetermined number at the cell site controller 24 (see FIG. 1) at the time the cell phone is activated at the retail store. However, the present invention is not limited by the particular technique used to collect the N fingerprint waveforms. As discussed above, in the presently preferred embodiment up to 10 fingerprint waveforms are used. However, those skilled in the art will appreciate that more or fewer fingerprint waveforms can be used. There is a danger that too few fingerprint waveforms will not provide an adequate statistical basis for matching an unauthenticated transmission characteristic. In step 204, the norrealizer processor 114 (see FIG. 4) normalizes each of the fingerprint waveforms $F_1$ to $F_N$ with respect to itself. As previously discussed, a mean is calculated for each individual waveform, and subtracted from the data points of its respective fingerprint waveform $F_1$ to $F_N$.

In step 206, the alignment processor 116 performs a temporal alignment of the fingerprint waveforms $F_1$ to $F_N$. As discussed above, the fingerprint waveforms $F_1$ to $F_N$ can be aligned by shifting one with respect to another and subtracting one waveform from the other until a minimum value is found. Those skilled in the art can appreciate that other techniques can also be used to provide the desired temporal alignment of the fingerprint waveforms $F_1$ to $F_N$. In the presently preferred embodiment, the alignment processor 114 will not shift any waveform more than 15% of the total waveform length. If the time shift exceeds this maximum value, the fingerprint waveform will not be used to generate the fingerprint.

In step 208, the mean processor 120 generates the composite mean waveform M and normalizes the composite mean waveform M with respect to itself. In step 210, the system 100 determines the overlapping portions of the composite mean waveform M and the fingerprint waveforms $F_1$ to $F_N$. In step 211, the system normalizes the overlapped portions of the composite waveform with respect to itself and also normalizes the overlapped portions of the fingerprint waveforms $F_1$ to $F_N$ with respect to themselves. It should be noted that the mean value of the overlapped portion of the composite waveform M is not necessarily identical to the mean value of the overall composite waveform M. In step 211, the system 100 computes the mean value only for the overlapped portions of the composite mean waveform M. Similarly, the mean value of the overlapping portion of the fingerprint waveforms $F_1$ to $F_N$ are not necessarily identical to the respective mean values of the overall fingerprint waveforms $F_1$ to $F_N$.

In step 212, shown in FIG. 6B, the mean processor 120 generates the difference waveforms $\overline{F}_1$ to $\overline{F}_{10}$ by subtracting the composite mean waveform M from each respective normalized aligned individual fingerprint waveform. In step 214, the waveform processor 124 raises each difference value in the difference waveforms $\overline{F}_1$ to $\overline{F}_{10}$ to an exponential power. As previously discussed, the waveform processor 124 uses the look-up table 126 to perform this function. In the presently preferred embodiment, each difference value in the difference waveforms $\overline{F}_1$ to $\overline{F}_{10}$ is raised to the power of 1.2.

Figure 7:
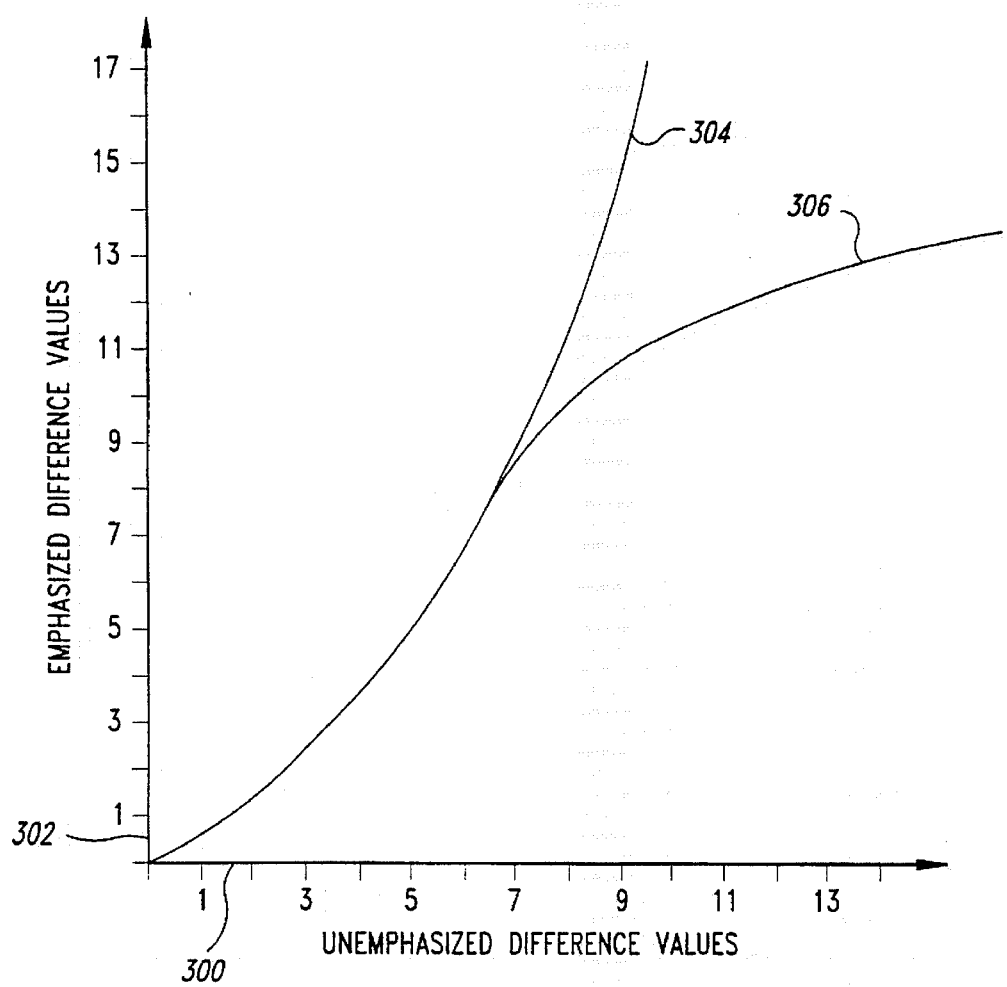
FIG. 7 is a graph illustrating possible emphasis curves used by the system of FIG. 4 to emphasize differences in transmission characteristics of the individual cellular telephone transmitter.

This weighting function is illustrated graphically in FIG. 7 where a horizontal axis 300 represents the unemphasized difference values of the individual difference waveforms $\overline{F}_1$ to $\overline{F}_{10}$. The unemphasized difference values on the horizontal axis 300 are inputs to the look-up table 126. The corresponding emphasized difference values from the look-up table 126 are shown on a vertical axis 302. A curve 304 illustrates the relationship between the unemphasized difference values on the horizontal axis 300 and the emphasized difference values on the vertical axis 302. The curve 304 graphically illustrates that when the difference between a data point in the individual difference waveforms and the corresponding data point in the composite mean waveform M is small, the emphasized difference value will also be correspondingly small. However, as the difference between a data point in the individual difference waveform and the corresponding data point in the composite mean waveform M grows larger, that difference is emphasized by the waveform processor 124. Thus, applying the weighting function emphasizes differences between the individual difference waveforms $\overline{F}_1$ to $\overline{F}_{10}$ and the composite mean waveform M.

Alternatively, other weighting functions can be used by the system 100. For example, a curve 306 can be programmed into the look-up table 126 to limit the maximum size of the difference values generated by the waveform processor 124. Thus, as the values in the difference waveforms $\overline{F}_1$ to $\overline{F}_{10}$ grow sufficiently large, that difference will be de-emphasized. Application of the curve 306 limits the effect of a burst noise on the analysis by the system 100. Those of ordinary skill in the art will recognize that other curves could also be programmed into the look-up table 126 to provide greater or lesser emphasis of differences between the individual difference waveforms and the composite mean waveform M.

Returning again to FIG. 6B, in step 216 the waveform processor 124 sums up all of the emphasized difference values for each of the individual difference waveforms $\overline{F}_1$ to $\overline{F}_{10}$. In step 220, the waveform processor 124 divides each of the summed values by Z, the number of data points in the overlapping portions of the waveforms, to generate the variability values $V_1$ to $V_N$. The variability values $V_1$ to $V_N$ provide the system 100 with an indication of the degree to which each of the individual difference fingerprint waveforms vary from the composite mean waveform M. In step 222, the statistical analyzer 130 computes a mean variability value $\overline{V}$ and a standard deviation $\sigma_V$ for the variability values $V_1$ to $V_N$. In step 226, the system 100 stores the fingerprint waveforms $F_1$ to $F_N$, the composite mean waveform M, the mean variability value $\overline{V}$, and the standard deviation $\sigma_V$ of the variability values in the data storage area 112 (see FIG. 4). The system 100 ends the process of analyzing fingerprint waveforms in step 230. At this point, the system 100 has characterized N individual transmissions believed to be from the cell phone 4, and determined the degree to which the individual transmission characteristics vary from the composite mean waveform. It is this variability from the composite mean waveform that will be subsequently used to authenticate an unauthenticated cell phone by comparing the transmission characteristics of the unauthenticated cell phone with the stored fingerprint.

The system 100 also includes a comparison processor 128 that compares the transmission characteristics of the unknown transmitter with the fingerprint waveforms.

The initial generation of the fingerprint (operation 1 above) is concluded when the fingerprint waveforms, composite mean waveform and statistical data (mean variability and standard deviation) are stored in the data storage area 112. The comparison of the unauthenticated cell phone (operation number 2) with the stored fingerprint uses many of the same components described above. Specifically, the receiver 102 (see FIG. 4) receives the identification data (ESN and/or MIN) from the unauthenticated cell phone. In the process of transmitting the identification data, the signal detected by the receiver 102 includes the transmission characteristic of the unauthenticated cell phone. As previously discussed, this transmission characteristic may be the phase history transient 50 (see FIG. 3), the tail transient 52, or other transmission characteristic. Those skilled in the art can understand that the transmission characteristic from the unauthenticated cell phone must correspond to the characteristic stored as the fingerprint. For example, if the transmission characteristic is the phase history transient 50, the stored fingerprint must also be the phase history transient. Clearly, the system cannot store a fingerprint of the tail transient 52 and subsequently analyze the phase history transient 50 and expect a match. Thus, the particular transmission characteristic from the unauthenticated cell phone must correspond to the transmission characteristics used in establishing the fingerprint. The demodulator 104 demodulates the RF signal and provides the transmission characteristic to the ADC 108. The transmission characteristic is digitized by the ADC 108 and provided to the various processors.

The normalizer processor 114 processes the transmission characteristic from the unauthenticated cell phone with respect to itself. The alignment processor 116 performs a temporal alignment of the normalized, unauthenticated transmission characteristic with the composite mean waveform M stored in the data storage area 112. As previously discussed, the transmitted identification information is used to determine which fingerprint in the data storage area 112 will be used for comparison with the authenticated transmission characteristic. As previously noted, the user can designate a maximum temporal shift as allowed before declaring that the unauthenticated transmission characteristic cannot be aligned with the composite mean waveform M. The alignment processor 116 also determines where the unauthenticated transmission characteristic and the composite mean waveform M overlap.

The mean processor 120 receives the unauthenticated transmission characteristic and that generates an unauthenticated normalized waveform in the manner previously described. The waveform processor 124 calculates the difference between each data point in the unauthenticated normalized waveform and the corresponding data point in the composite mean waveform M. The waveform processor 124 raises each difference value to the exponential power using the look-up table 126 as previously described.

The statistical analyzer 130 calculates a variability value for the unauthenticated transmission characteristic. The comparison processor 128 compares the variability value for the unauthenticated transmission characteristic with the variability values of the reference fingerprint waveforms $F_1$ to $F_{10}$ with respect to the composite mean waveform M. In this manner, the comparison processor 128 can determine whether the unauthenticated transmission characteristic has a greater or less degree of variability from the composite mean waveform M than do the fingerprint waveforms $F_1$ to $F_{10}$.

The comparison processor 128 uses statistical measures of these variability values to determine whether the unauthenticated, unidentified transmission characteristic is a suitable match to the stored fingerprint. The comparison processor 128 calculates a confidence value indicating the level of confidence that the unauthenticated transmission characteristic matches the corresponding stored fingerprint. The comparison processor 128 uses a comparison formula having the following form:

$$CV = \frac{V_u - \overline{V}}{\sigma_v} \quad (2)$$

where CV is the confidence value, $V_u$ is the calculated variability of the unauthenticated transmission characteristic, $\overline{V}$ is the mean variability for the variability values $V_1$ to $V_{10}$ for the fingerprint waveforms $F_1$ to $F_{10}$, and $\sigma_v$ is the standard deviation of the variability values $V_1$ to $V_{10}$.

As indicated by equation (2) above, if the confidence value CV equals 0, then the unauthenticated transmission characteristic is as different from the composite mean waveform M as is the average fingerprint waveform. If the confidence value CV is less than 0, the unauthenticated transmission characteristic is closer to the composite mean waveform M than the average fingerprint waveform. Conversely, if the confidence value CV is greater than 0, the unauthenticated transmission characteristic is further from the composite mean waveform M than is the average fingerprint waveform. In operation, the user may select a predetermined value for the confidence value CV at which the unauthenticated transmission characteristic will be considered an unacceptable match with the stored fingerprint. It should be noted that this confidence value may be arbitrarily selected by the user to provide the desired degree of accuracy in matching the unauthenticated transmission characteristic with the stored fingerprint.

In normal operation, the mean variability $\overline{V}$ and standard deviation $T_V$ are precomputed at the time the fingerprint is initially generated (operation number 1). Therefore, the system 100 need only compute the variability of the unauthenticated transmission characteristic $V_U$ and calculate the confidence value CV. Those computations can be done in real time thus providing a valuable technique for the detection of unauthorized cell phones.

Figure 8:
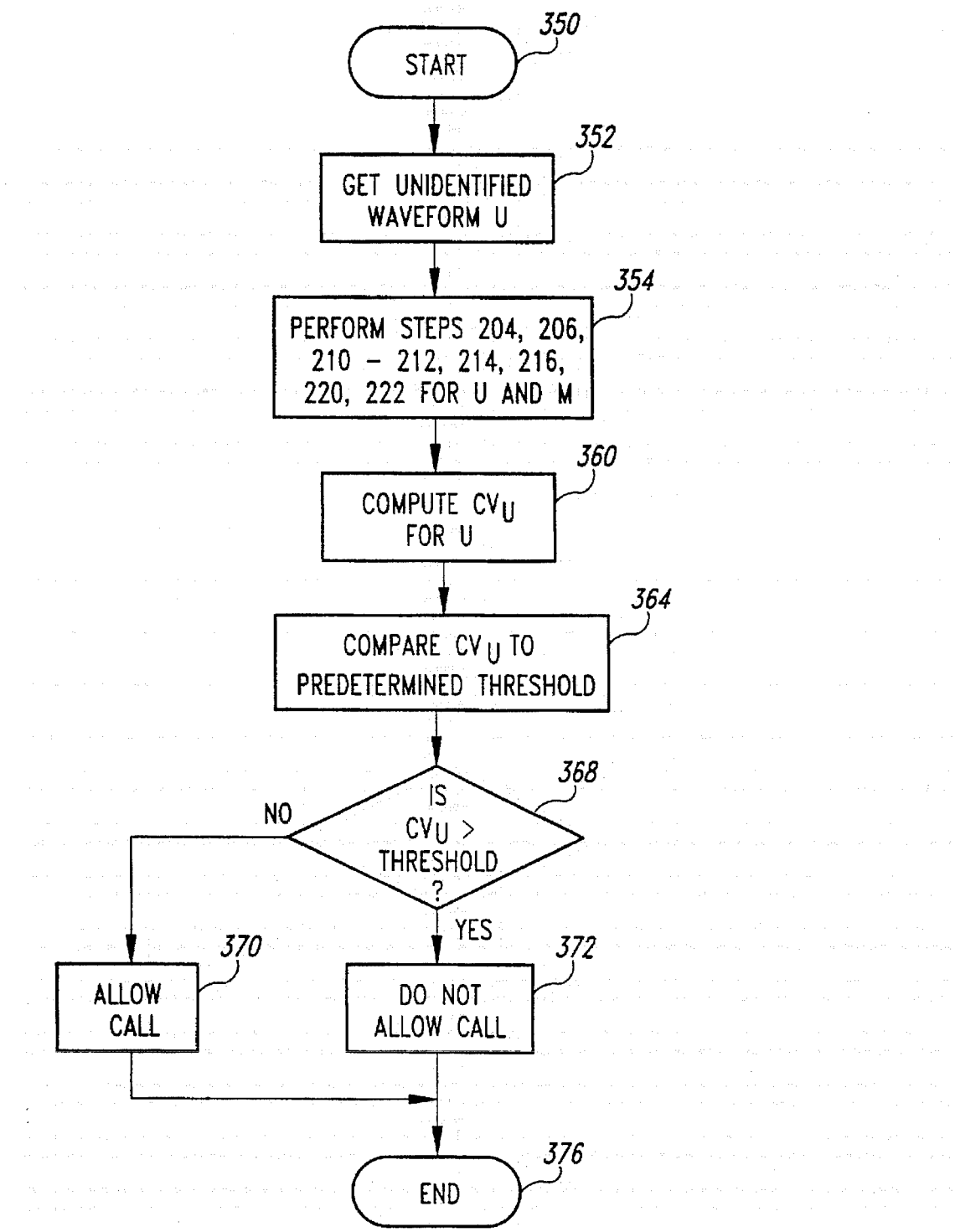
FIG. 8 is a flowchart of the operation of the system of FIG. 4 to determine whether the transmission characteristics of an unidentified cellular telephone transmitter match the stored characteristics corresponding to that cellular telephone transmitter.

The comparison of the unauthenticated transmission characteristic with the stored fingerprint (operation number 2 above) is illustrated in the flowchart of FIG. 8. At the start 350, the cell site controller 24 (see FIG. 1) has received the ESN and MIN for a particular cell phone 4. As previously discussed, the phone call may be from the cell phone 4 or an illegal cell phone using illegal identification. The system 100 will determine if the unauthenticated transmission characteristics of this unauthenticated cell phone match the stored transmission characteristics corresponding to the ESN/MIN fingerprint stored in the data storage area 112 (see FIG. 4) for the cell phone 4. At the start 350, the ADC 108 has converted the demodulated signal and converted the phase history transient 50 (see FIG. 3) or other transmission characteristic to digital form. As discussed above, the system 100 can analyze the tail transient 52 (see FIG. 3) or other transmission characteristic.

In step 352, the system 100 receives an unauthenticated transmission characteristic, designated herein as an unauthenticated waveform U from the ADC 108. As discussed above, the system 100 performs an analysis of the unauthenticated waveform U similar to that of the fingerprint waveforms $F_1$ to $F_N$. For the sake of brevity, these steps are summarized in step 354, where the normalizer processor 114 normalizes the unauthenticated waveform U with respect to itself, and the alignment processor 116 performs a temporal alignment of the unidentified waveform U with the composite mean waveform M. The alignment processor 116 also determines overlapping portions of the unauthenticated waveform U with respect to the composite mean waveform M. The normalizer processor 114 normalizes the overlapped portions of the composite mean waveform M with respect to itself and the overlapped portions of the unauthenticated waveform U with respect to itself. As previously discussed, the mean value for the overlapping portions of the composite mean waveform M are not necessarily identical to the mean value of the entire composite mean waveform M. Similarly, the mean value of the overlapped portions of the unauthenticated waveform U is not necessarily identical to the mean value for the entire waveform U.

The waveform processor 124 calculates differences between the overlapped portions of the unauthenticated waveform U and the composite mean waveform M to generate a difference waveform for the unauthenticated waveform U. The data points of this difference waveform are processed by the waveform processor 124 and raised to the same exponential power as were the difference values for the difference waveforms $\overline{F}_1$ to $\overline{F}_N$ (i.e., 1.2 in the preferred embodiment). The waveform processor 124 also sums the emphasized difference values for the unauthenticated waveform U and divides by the number of data points to generate a variability value $V_U$ for the unauthenticated waveform U.

In step 360, the comparison processor 128 calculates the confidence value using equation (2) above to provide an indication of how closely the variability of the unauthenticated waveform U matches the variability $V_1$ to $V_N$ of the fingerprint waveforms $F_1$ to $F_N$. In step 364, the comparison processor 128 compares the computed confidence value CV to a predetermined threshold. In decision 368, the system 100 determines whether the computed confidence value CV exceeds the predetermined threshold. If the computed confidence value is less than the predetermined threshold, the result of decision 368 is NO, in that event, the system authenticates the unauthenticated cell phone at the cell phone 4 and permits the call to proceed in step 370. The system ends the analysis of the unauthenticated waveform U in step 376. If the computed confidence value exceeds the predetermined threshold, the result of decision 368 is YES. In that event, the system 100, in step 372, will not allow the cellular phone call to proceed and be completed. Following step 372, the system 100 ends the analysis of the unauthenticated waveform U in step 376. In addition, the system 100 can generate an audible and visual warning to the individual monitoring the cell site controller 24 (see FIG. 1) that a fraudulent cell phone is operating with the particular transmitted ESN and MIN. Thus, the system 100 determines the degree to which the variability of the unauthenticated waveform U matches the variability of fingerprint waveforms $F_1$ to $F_N$ that are known or believed very likely to be from the authentic cell phone 4. As discussed above, a confidence value less than or equal to zero means that the unauthenticated waveform U varies from the composite mean waveform M with less than or the same degree of variability as the fingerprint waveforms $F_1$ to $F_N$. In contrast, if the confidence value CV exceeds zero, this indicates that the variability of the unidentified waveform U exceeds the variability of the fingerprint waveforms $F_1$ to $F_N$.

The function of the system 100 for the establishment of the initial fingerprint (operation number 1) and the comparison of the unauthenticated waveform U to the fingerprint (operation number 2) have now been described. The system 100 can accept a predetermined number N of fingerprint waveforms, and "lock" the fingerprint so that it remains static and unchanging over time. However, as previously discussed, the transmission characteristics of the cell phone 4 will change over time or due to environmental or other external factors, such as temperature. The system 100 is an adaptive waveform matching system in that it can accommodate such changes. The system 100 can periodically update the fingerprint or continuously update the fingerprint at the user's discretion.

When an unauthenticated waveform U has been authenticated using the stored fingerprint, the system 100 makes an additional decision whether or not to include this now identified waveform, designated herein as a waveform I to show that it is identified as an authentic waveform, as part of the stored fingerprint for future analysis. The system 100 applies a much more stringent analysis of the identified waveform I prior to including it in the stored fingerprint. In addition to being considered an acceptable match to the stored fingerprint, the identified waveform I must have sufficiently good quality in terms of signal strength and variability and pass additional tests prior to being included as one of the stored fingerprint waveforms in the stored fingerprint.

The cell site controller 24 applies a series of external verification tests to determine if the unauthenticated cell phone is the authentic cell phone 4. These tests, such as verification of dialed digits, time and day of telephone calls, geographical origin of telephone calls, and the like, are known in the art, and will not be discussed in greater detail herein. However, the identified waveform I will not be included in the stored fingerprint if it does not meet the external verification criteria. The cell site controller 24 calculates a received signal strength index (RSSI) value indicative of the strength of the received signal. This value may fluctuate over time due to environmental factors. For example, the user may be in a moving automobile, thus causing fluctuations in the RSSI. The system 100 will not permit the identified waveform I to be included in the stored fingerprint if the RSSI is below a minimum threshold value (i.e., the received signal is too weak) or if the RSSI variability is greater than a predetermined maximum value (i.e., the signal strength fluctuates too much). These tests assure that the identified waveform I is of sufficient quality to be analyzed for possible inclusion in the stored fingerprint.

In addition, the system 100 determines whether the identified waveform I is comparable in length to the fingerprint waveforms $F_1$ to $F_N$ stored in the data storage area 112 (see FIG. 4). In addition, the system determines that the identified waveform I did not require excessive time shifting to be properly aligned with the composite mean waveform M in the fingerprint. If the identified waveform I is not of comparable length, or required excessive time shifting, the system 100 will not include the identified waveform I in the stored fingerprint even though it may have been an acceptable match for purposes of permitting the telephone call to be completed. Thus, the system requires a series of preliminary deterministic tests to assure that only high quality signals with a great degree of reliability are included in the stored fingerprint.

In addition to the preliminary tests described above, the system 100 applies a "sore-thumb" analysis to the identified waveform I and the stored fingerprint and discards any stored fingerprint waveform that is considered unreliable. This analysis is called a "sore-thumb analysis" because it distinguishes any already stored fingerprint waveform that "sticks out like a sore thumb" and eliminates that waveform from the fingerprint. In its adaptive mode, the system 100 analyzes not only the identified waveform I, but all stored fingerprint waveforms $F_1$ to $F_N$, and their respective data values. The sore-thumb analysis is performed by constructing a temporary fingerprint using the fingerprint waveforms $F_1$ to $F_N$ and computing the confidence value of identified waveform I with respect to the fingerprint for the fingerprint waveforms $F_1$ to $F_N$. The system 100 then includes the identified waveform I and eliminates one of the other fingerprint waveforms (e.g., $F_1$) and computes the confidence value for the fingerprint waveform $F_1$ with respect to the fingerprint that now includes the fingerprint waveforms $F_2$ to $F_N$ and I. The process is repeated so that confidence values are calculated for each of the fingerprint waveforms, and the identified waveform I with respect to a fingerprint containing the remaining fingerprint waveforms. The largest calculated confidence value is then compared to a maximum allowable confidence value for the number of waveforms in the fingerprint. If the maximum calculated confidence value exceeds the threshold for the number of waveforms in the fingerprint, that fingerprint waveform with the maximum confidence value and its associated data is eliminated from the fingerprint.

Figure 9:
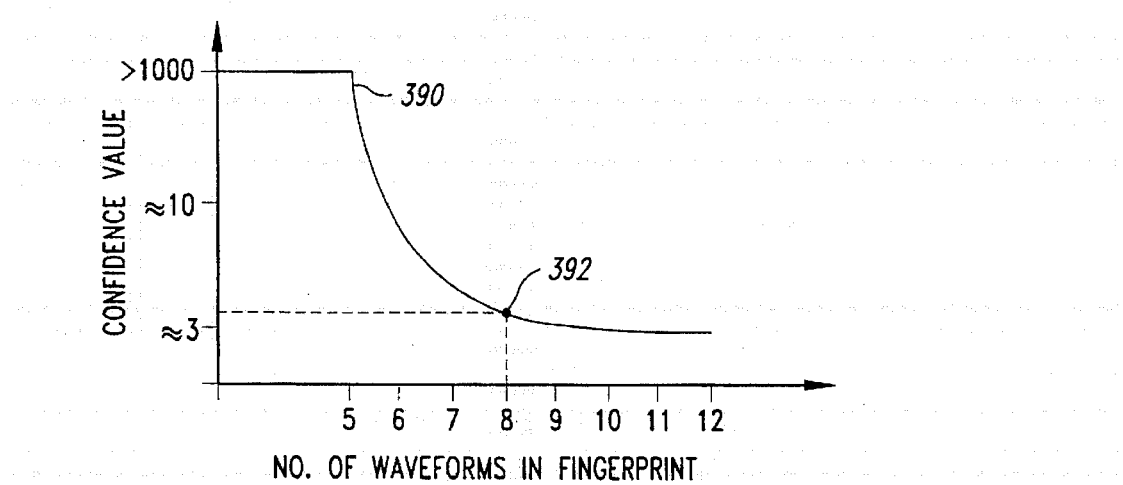
FIG. 9 illustrates the operation of the system of FIG. 4 to determine whether stored waveforms should be included in fingerprint data.

For example, consider a fingerprint having seven fingerprint waveforms $F_1$ to $F_7$, and the identified waveform I, for a total of eight waveforms in the fingerprint. The system 100 computes a fingerprint using the fingerprint waveforms $F_1$ to $F_7$ and computes confidence value $V_8$ for the identified waveform I. The system repeats the process and determines a confidence value for $V_1$ with respect to the fingerprint comprising the fingerprint waveforms $F_2$ to $F_8$. The confidence value for $V_2$ is computed with respect to the fingerprint comprising the fingerprint waveforms $F_1$ and $F_3$ to $F_8$. The confidence value for $V_3$ is compared to the fingerprint including the fingerprint waveforms $F_1$, $F_2$ and $F_4$ to $F_8$. This process continues and confidence values $CV_1$ to $CV_8$ are computed. The largest of the confidence values $CV_1$ to $CV_8$ is compared to a predetermined maximum value for the confidence value for eight fingerprint waveforms in the fingerprint. An empirically derived curve 390 is illustrated in FIG. 9 showing the maximum value for confidence value as a function of the number of fingerprint waveforms included in the fingerprint. In the example presented above with eight waveforms in the fingerprint, the maximum confidence value for any particular waveform is indicated by a point 392 on the curve 390, corresponding to a confidence value CV of approximately 3.5. If one of the computed confidence values $CV_1$ to $CV_8$ exceeds this maximum value, that particular fingerprint waveform is eliminated from the fingerprint.

It should be noted that the sore-thumb analysis can eliminate any waveform that exceeds the maximum confidence value. This is not necessarily the identified waveform/, but can be any friendly/fingerprint waveform already stored in the fingerprint in the data storage area 112 (see FIG. 4). It should also be noted that, if the maximum computed confidence values $CV_1$ to $CV_8$ does not exceed the maximum value, all fingerprint waveforms will be included in the fingerprint. Whenever the fingerprint is altered, such as by the inclusion of the identified waveform I, a new composite mean waveform M must be calculated and new fingerprint statistical values (i.e., mean variability and standard deviation) must also be calculated. The new composite waveform and statistical data is stored in the data storage area 112.

Figure 10A:
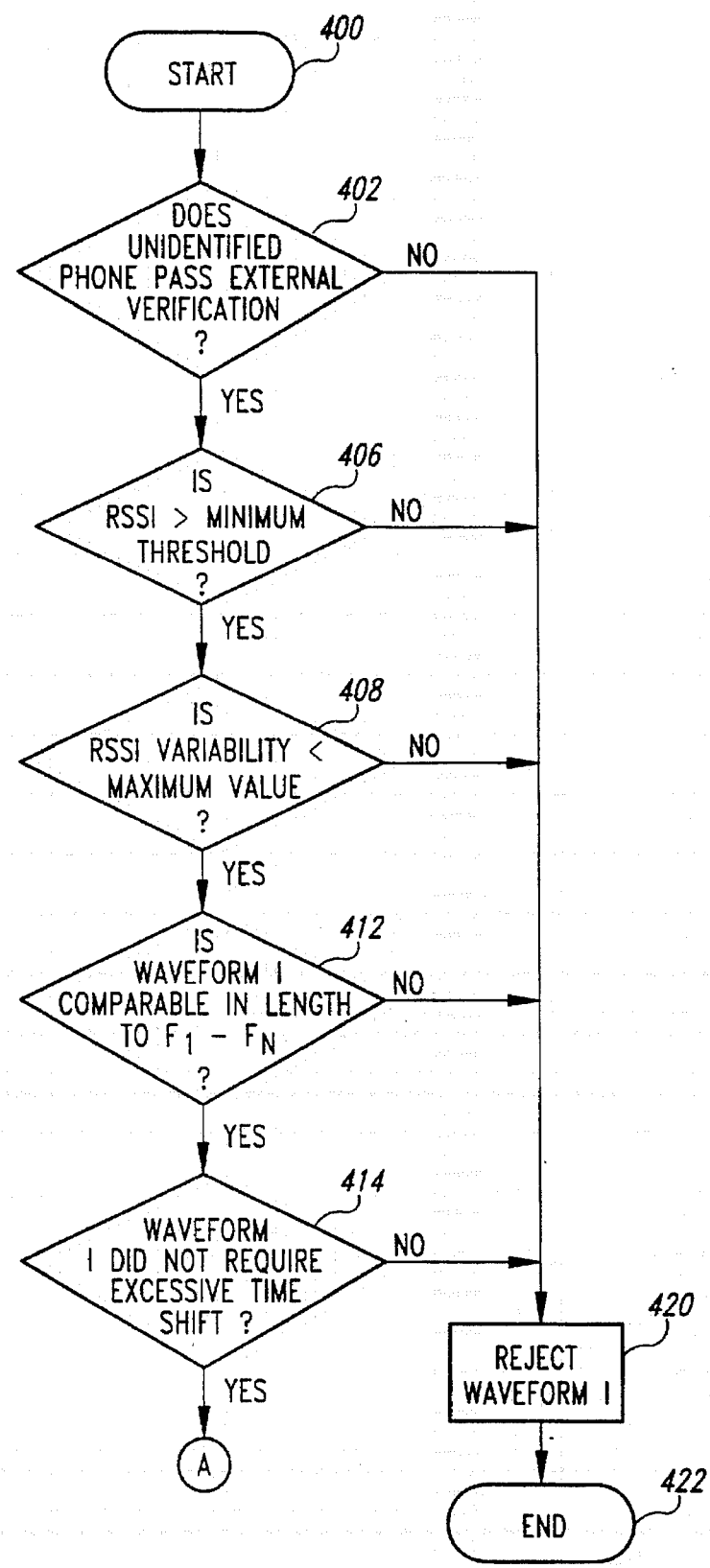
FIGS. 10A and 10B together are flowcharts of the operation of the system of FIG. 4 to determine whether particular waveforms should be included in the fingerprint data.
Figure 10B:
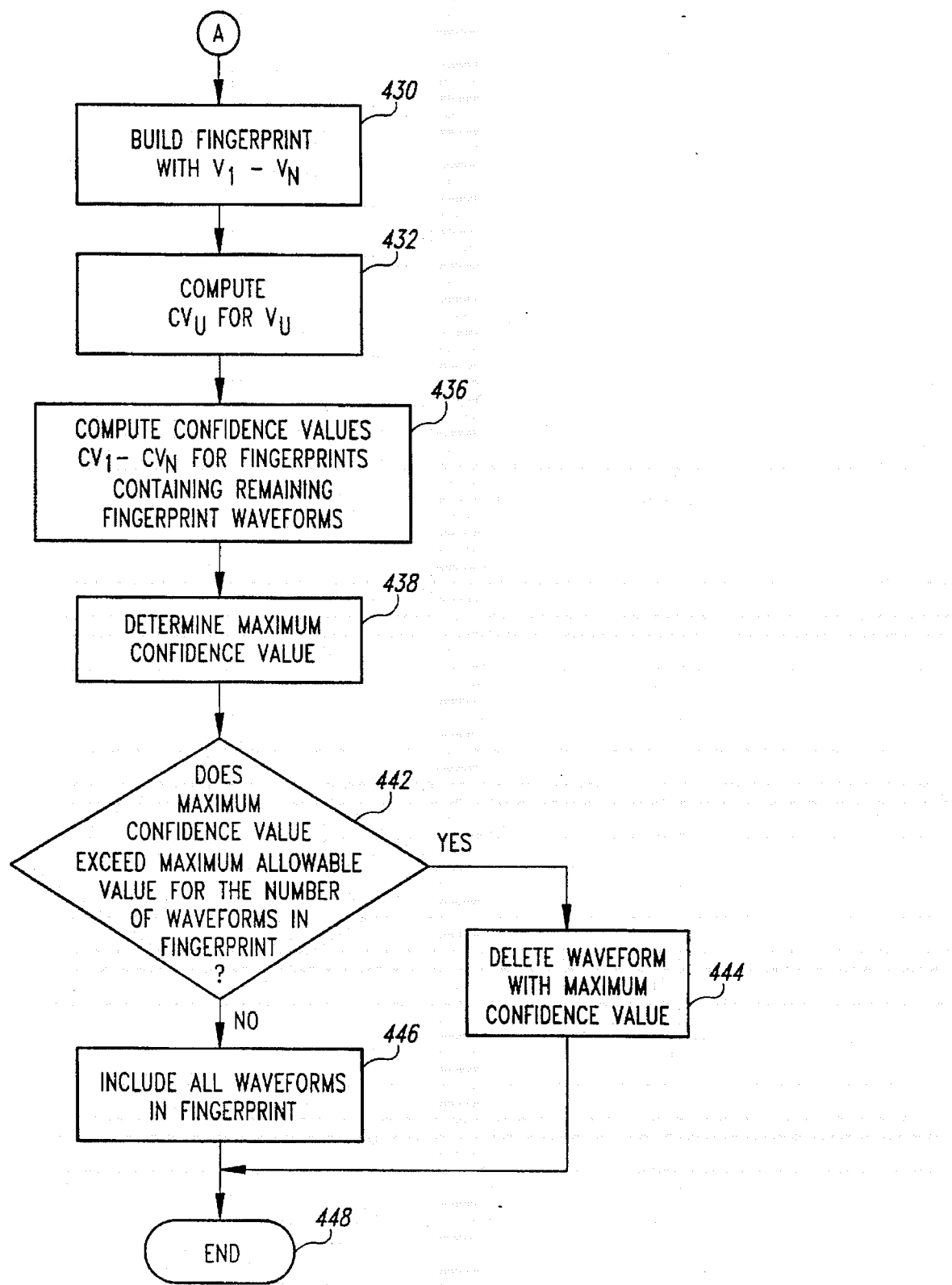

The flowcharts of FIGS. 10A and 10B illustrate the operation of the system 100 to determine whether a particular fingerprint waveform should be included in the fingerprint. At the start 400, the identified waveform I has been identified as being a suitable match to the corresponding fingerprint. In decision 402, the system determines whether the unauthenticated cell phone has passed the external verification criteria. It should be noted that the external verification test of decision 402 could be performed outside of the process described in FIGS. 10A and 10B. For example, the external verification test can be used by the system 100 to authenticate the unauthenticated cell phone and, if the unauthenticated cell phone is authenticated in the manner described above, the external verification test can be used to trigger the sore-thumb analysis of FIGS. 10A and 10B. If the unauthenticated cell phone has passed the external verification criteria, the result of decision 402 is YES. In that event, the system determines whether the RSSI is greater than a minimum threshold in decision 406. If the RSSI is greater than the minimum threshold, the result of decision 406 is YES. In that event, the system, in decision 408, determines whether the variability of the RSSI was less than a predetermined maximum value. If the RSSI variability is less than the maximum value, the result of decision 408 is YES.

If the result of decision 408 is YES, in decision 412, the system 100 determines whether the identified waveform I is comparable in length to the stored fingerprint waveforms $F_1$ to $F_N$. If the identified waveform I is comparable in length to the stored fingerprint waveforms $F_1$ to $F_N$, the result of decision 412 is YES. In that event, in decision 414, the system 100 determines whether the identified waveform I required excessive time shifting. It should be noted that the system 100 can use a different maximum shifting value in the fingerprint inclusion analysis than was used in the waveform matching analysis of FIGS. 6A–6B. If the identified waveform I did not require excessive time shifting, the result of decision 414 is YES. In that event, the system proceeds to the sore-thumb analysis illustrated in the flowchart of FIG. 10B. If the result of any of the decisions 402, 406, 408, 412, or 414 were NO, the system rejects the identified waveform I in step 420 and ends the analysis in step 422. A rejection means the identified waveform I will not be included in the fingerprint even though it was considered a match for purposes of permitting the completion of the telephone call.

The sore-thumb analysis is illustrated in the flowchart of FIG. 10B where, in step 430, the system 100 constructs a fingerprint using the variability values $V_1$ to $V_{10}$ in the example of ten fingerprint waveforms. In step 432, the system calculates a confidence value $CV_U$ for the variability $V_U$ of the identified waveform I. It should be noted that the fingerprint constructed in step 430 in the computation of the confidence value for the identified waveform I has previously been calculated for the initial waveform authentication analysis (operation number 2) described above. However, these steps are included in this description for the sake of completeness.

In step 436, the system calculates confidence values $CV_1$ to $CV_{10}$ for fingerprints containing the remaining fingerprint waveforms. As described above, the confidence values for each respective fingerprint waveform includes the remaining fingerprint waveforms and the identified waveform I. For example, the confidence value $CV_1$ is calculated using the fingerprint waveforms $F_2$ to $F_{10}$ and the identified waveform I. The confidence value $CV_3$ is calculated against a fingerprint containing the fingerprint waveforms $F_1$, $F_2$, $F_4$ to $F_{10}$, and I. The remaining confidence values are calculated in a similar manner. In step 438, the system 100 determines the maximum confidence value from the confidence values $CV_1$ to $CV_{10}$ and $CV_U$.

In decision 442, the system 100 determines whether that maximum confidence value determined in step 438 exceeds the maximum allowable confidence value for the given number of fingerprint waveforms in the fingerprint. If the maximum confidence value does exceed the maximum allowable confidence value, the result of decision 442 is YES. In that event, the system deletes the waveform with the maximum confidence value in step 444. The system ends the analysis in step 448. If the maximum confidence value determined in step 438 does not exceed the maximum allowable confidence value for the given number of fingerprint waveforms in the fingerprint, the result of decision 442 is NO. In that event, in step 446 the system includes all waveforms, including the identified waveform I, in the fingerprint. The system 100 ends the analysis in step 448.

It should be noted that the modification of the fingerprint (operation number 3) need not be performed in real time. Rather, the system 100 can perform the fingerprint modification analyses periodically or during periods of low call volume. This assures that the fingerprint in the data storage area 112 (see FIG. 4) adapts to changes in the transmission characteristics of the authentic cell phone 4.

Thus, the system 100 provides an adaptive waveform matching procedure that determines whether the transmission characteristics of an unidentified cell phone are sufficiently close to a stored fingerprint corresponding to the identification number (i.e., ESN or MIN or both) of the unidentified cell phone and also determines whether to add the current transmission characteristic waveform to the fingerprint. The system 100 can adapt to both short-term and long-term changes in the transmission characteristics and permit the user to select a maximum variability that will be allowed before rejecting a particular transmitter as being an unsuitable match to the stored fingerprint. The system is automated and can provide real-time analysis of a large number of cell phone calls within a short period of time.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the identification of an individual unauthenticated transmitter as an authentic transmitter or an unauthorized transmitter when operating in an environment containing a plurality of similar transmitters, the system comprising:

a radio frequency receiver circuit receiving a radio transmission from the unauthenticated transmitter that can be the authentic transmitter or the unauthorized transmitter, said received radio transmission including identification data identifying the unauthenticated transmitter as the authentic transmitter;

a demodulator demodulating said received radio transmission to generate a demodulated signal, said demodulated signal including a first unauthenticated response signal;

a data storage area which stores a plurality of response waveforms designated as reference waveforms for the authentic transmitter;

a normalizer processor which receives each of said reference waveforms from said data storage area and normalizes each of said reference waveforms, said normalizer processor also receiving and normalizing said first unauthenticated response signal;

a mean processor which computes a composite mean waveform from said normalized waveforms;

a waveform processor which computes difference values between each of said individual normalized waveforms and said composite mean waveform, said waveform processor applying a weighting function to each of said difference values to generate weighted values and summing each of said weighted values to generate a variability value for each of said individual normalized waveforms, said variability values indicating a variability of each of said individual normalized waveforms from said composite mean waveform, said waveform processor also computing first unauthenticated difference values between said first unauthenticated normalized waveform and said composite mean waveform and applying said weighting function to each of said unauthenticated difference values to generate first unauthenticated weighted values and summing each of said first unauthenticated weighted values to generate a first unauthenticated variability value for said first unauthenticated normalized waveform, said first unauthenticated variability value indicating a variability of said first unauthenticated normalized waveform from said composite mean waveform; and a comparison processor which compares said first unauthenticated variability value to said variability values for said individual reference waveforms to determine whether the unauthenticated transmitter is the authentic transmitter or the unauthorized transmitter.

2. The system of claim 1, further including a statistical analyzer to compute statistical measures of said variability values for said individual reference waveforms and said unauthenticated variability value, said comparison processor using said statistical measures to determine whether the unauthenticated transmitter is the authentic transmitter.

3. The system of claim 2 wherein said statistical analyzer calculates a mean variability value of said variability values for said individual mean waveforms and a standard deviation of said variability values for said individual mean waveforms, said comparison processor using said mean variability value and said standard deviation to determine whether the unauthenticated transmitter is the authentic transmitter.

4. The system of claim 2 wherein said comparison processor calculates a confidence value indicative of the level of confidence with which the unauthenticated transmitter is identified as the authentic transmitter, said confidence value having the following form:

$$CV = \frac{V_U - \overline{V}}{\sigma_V}$$

where CV is said confidence value, $V_U$ is said first unauthenticated variability value, $\overline{V}$ is a mean variability value of said variability values for said individual reference waveforms, and $\sigma_V$ is a standard deviation of said variability values for said individual reference waveforms.

5. The system of claim 4 wherein said comparison processor generates an indication that the unauthenticated transmitter is the authentic transmitter if said confidence value is less than or equal to a predetermined threshold.

6. The system of claim 5 wherein said predetermined threshold is between two and three.

7. The system of claim 1 wherein each of said reference waveforms has a response start as a function of time, the system further including an alignment processor to shift said response start and temporally align said reference waveforms, said data storage area storing said temporally aligned reference waveforms.

8. The system of claim 1 wherein said first unauthenticated response signal is a transmitter transient comprising one of a group including a turn-on transient and a turn-off transient.

9. The system of claim 1 wherein said demodulated signal includes a second unauthenticated response signal, and said normalizer processor receives and normalizes said second unauthenticated response signal, said waveform processor computes second unauthenticated difference values between said second unauthenticated response mean waveform and said composite mean waveform to generate second difference values and applies said weighting function to said second difference values to generate second unauthenticated weighted values and sums each of said second unauthenticated weighted values to generate a second unauthenticated variability value indicating a variability of said second unauthenticated normalized waveform from said composite mean waveform, and said comparison processor compares said first and second unauthenticated variability values to said variability values of said individual reference waveforms to determine whether the unauthenticated transmitter is the authentic transmitter.

10. The system of claim 9 wherein said second unauthenticated response signal is a transmitter transient comprising one of a group of a turn-on transient and a turn-off transient.

11. The system of claim 1 wherein said waveform processor applies said weighting function by raising said difference values to a power greater than one.

12. The system of claim 11, further including a look-up table having a input index with a range corresponding to a range of values for said difference values and corresponding output values with a range corresponding to said difference values raised to said power greater than one, said waveform processor applying said weighting function by transmitting particular values for said difference to said look-up table input index and reading said corresponding output value corresponding to said difference values raised to said power greater than one.

13. The system of claim 1 wherein said waveform processor applies said weighting function raising said difference values to a power of 1.2.

14. The system of claim 1, further including a modification processor to analyze said first unauthenticated response signal and said individual reference waveforms and to include said first unauthenticated response signal as an additional one of said reference waveforms only if said first unauthenticated response signal has a predefined acceptable characteristic, said mean processor computing a new composite mean waveform if said first unauthenticated response signal is included as said additional reference waveform.

15. The system of claim 14 wherein said radio transmission from the unauthenticated transmitter has a received signal strength and a signal strength variability, said modification processor analyzing said received signal strength and said signal strength variability as said predefined acceptable characteristic, said modification processor including said first unauthenticated response signal as said additional reference waveform only if said received signal strength is above a predetermined signal threshold and said signal strength variability is below a predetermined variability threshold.

16. The system of claim 14 wherein said first unauthenticated response signal has a measured length and an initial response start as a function of time, the system further including an alignment processor to shift said initial response start and temporally align said first unauthenticated response signal with respect to said composite mean waveform, said modification processor including said first unauthenticated response signal as said additional reference waveform only if said measured length is substantially equal to a measured length of said composite mean waveform and said temporal alignment is below a predetermined alignment threshold.

17. The system of claim 1, further including a modification processor which analyzes said reference waveforms and determines a confidence value for each of said reference waveforms, said modification processor comparing said calculated confidence values to a maximum confidence value and removing a particular reference waveform from said data storage area if said calculated confidence value for said particular reference waveform exceeds said maximum confidence value.

18. The system of claim 17 wherein said maximum confidence value is dependent on a number of said reference waveforms in said data storage area, said maximum confidence value decreasing as said number of reference waveforms in said data storage area increases.

19. The system of claim 18 wherein said waveform processor applies said weighting function by raising said first unauthenticated difference values to a power greater than one.

20. The system of claim 18 wherein the statistical values related to the reference waveforms and the composite mean waveform are variability values for each of individual reference waveforms derived from the respective individual reference waveforms and said comparison processor uses said variability values to determine whether the unauthenticated transmitter is the authentic transmitter.

21. The system of claim 19 wherein the statistical values related to the reference waveforms and the composite mean waveform are a mean variability value of said variability values for each of said individual mean waveforms and a standard deviation of said variability values for each of said individual mean waveforms, said comparison processor using said mean variability value and said standard deviation to determine whether the unauthenticated transmitter is the authentic transmitter.

22. The system of claim 19 wherein said comparison processor calculates a confidence value indicative of the level of confidence with which the unauthenticated transmitter is identified as the authentic transmitter, said confidence value having the following form:

$$CV = \frac{V_U - \overline{V}}{\sigma_V}$$

where CV is said confidence value, $V_U$ is said first unauthenticated response variability value, $\overline{V}$ is a mean variability value of said variability values of said individual reference waveforms, and $\sigma_V$ is a standard deviation of said variability value for said individual reference waveforms.

23. The system of claim 22 wherein said comparison processor generates an indication that the unauthenticated transmitter is the authentic transmitter if said confidence value is less than or equal to a predetermined threshold.

24. The system of claim 23 wherein said predetermined threshold is between two and three.

25. A system for the authentication of an individual unauthenticated transmitter as an authentic transmitter or an unauthorized transmitter when operating in an environment containing a plurality of similar transmitters, the system including a plurality of stored response signals from the authentic transmitter designated as reference waveforms for the authentic transmitter, a composite mean waveform derived from the reference waveforms, and statistical values related to the reference waveforms and the composite mean waveform, the system comprising:

a receiver circuit which receives a transmission from the unauthenticated transmitter that can be the authentic transmitter or the unauthorized transmitter, said received transmission including a first unauthenticated response signal and identification data identifying the unauthenticated transmitter as the authentic transmitter;

a waveform processor which computes first unauthenticated difference values between a first unauthenticated normalized waveform and the composite mean waveform, said waveform processor applying a weighting function to each of said first unauthenticated difference values to generate a first unauthenticated variability value for said first unauthenticated mean waveform, said first unauthenticated variability value indicating a variability of said first unauthenticated mean waveform from the composite mean waveform; and a comparison processor which compares said first unauthenticated variability value to the statistical values related to the reference waveforms and the composite mean waveform to determine whether the unauthenticated transmitter is the authentic transmitter or the unauthorized transmitter.

26. The system of claim 25 wherein the statistical values related to the reference waveforms and the composite mean waveform are derived from normalized reference waveforms, the system further including a normalizer processor which receives and normalizes said first unauthenticated response signal.

27. The system of claim 25, further including a demodulator to demodulate said transmission, said first unauthenticated response signal being derived from said demodulated transmission.

28. The system of claim 27 wherein said first unauthenticated response signal is a transmitter turn-on transient.

29. The system of claim 27 wherein said first unauthenticated response signal is a transmitter turn-off transient.

30. The system of claim 25 wherein said received transmission includes a second unauthenticated response signal, and said normalization processor computes a second unauthenticated response normalized waveform from said second unauthenticated waveform, said waveform processor computes second unauthenticated difference values between said second unauthenticated normalized waveform and the composite mean waveform and applies said weighting function to each of said second unauthenticated difference values to generate a second unauthenticated variability value for said second unauthenticated mean waveform, and said comparison processor compares said first and second unauthenticated variability values to the statistical values related to the reference waveforms and the composite mean waveform to determine whether the unauthenticated transmitter is the authentic transmitter or the unauthorized transmitter.

31. A system for the development of a reference fingerprint used in the authentication of an individual unauthenticated transmitter as an authentic transmitter or an unauthorized transmitter when operating in an environment containing a plurality of similar transmitters where the unauthenticated transmitter transmits identification data identifying the unauthenticated transmitter as the authentic transmitter, the transmission including an unauthenticated response signal, the system comprising:

a data storage area which stores a plurality of response waveforms designated as reference waveforms for the authentic transmitter;

a mean processor which computes a composite mean waveform from said reference waveforms; and a waveform processor which computes difference values between each of said reference waveforms and said composite mean waveform, said waveform processor applying a weighting function to each of said difference values to generate weighted values, said waveform processor using said weighted values to generate a variability value for each of said reference waveforms, said variability values indicating a variability of each of said reference waveforms from said composite mean waveform, whereby the system processes the unauthenticated response signal to generate an unauthenticated variability value for the unauthenticated response signal and compares the unauthenticated variability value with the variability values for each of said reference waveforms to determine whether the unauthenticated transmitter is the authentic transmitter or the unauthorized transmitter.

32. The system of claim 31 wherein said waveform processor sums each of said weighted values to generate said variability values for each of said reference waveforms.

33. The system of claim 31, further including a statistical analyzer to compute a statistical measure of said variability values for said reference waveforms, whereby said statistical measure is used to determine whether the unauthenticated transmitter is the authentic transmitter or the unauthorized transmitter.

34. The system of claim 33 wherein said statistical analyzer calculates a mean variability value of said variability values for said reference waveforms and a standard deviation of said variability values for said reference waveforms, whereby said mean variability value and said standard deviation are used to determine whether the unauthenticated transmitter the authentic transmitter or the unauthorized transmitter.

35. The system of claim 33, further including a comparison processor which calculates a confidence value indicative of the level of confidence with which the unauthenticated transmitter is identified as the authentic transmitter, said confidence value having the following form:

$$CV = \frac{V_U - \overline{V}}{\sigma_V}$$

where CV is said confidence value, $V_U$ is the unauthenticated response variability value, $\overline{V}$ is a mean variability value of said variability values for said reference waveforms, and $\sigma_V$ is a standard deviation of said variability values for said reference waveforms.

36. The system of claim 35 wherein said comparison processor generates an indication that the unauthenticated transmitter is the authentic transmitter if said confidence value is less than or equal to a predetermined threshold.

37. The system of claim 36 wherein said predetermined threshold is between two and three.

38. The system of claim 31 wherein said waveform processor applies said weighting function by raising said difference values to a power greater than one.

39. The system of claim 31, further including a normalizer processor which receives and normalizes each of said reference waveforms, said mean processor computing said composite mean waveform from said normalized reference waveforms.

40. The system of claim 31, further including a modification processor which analyzes the unauthenticated response signal and said reference waveforms for possible inclusion of the unauthenticated response signal as an additional one of said reference waveforms only if the unauthenticated response signal has a predefined acceptable characteristic, said mean processor computing a new composite mean waveform if the unauthenticated response signal is included as said additional reference waveform.

41. The system of claim 40 wherein the transmission from the unauthenticated transmitter has a received signal strength and a signal strength variability, said modification processor analyzing said received signal strength and said signal strength variability as said predefined acceptable characteristic, said modification processor including said unauthenticated response signal as said additional reference waveform only if said received signal strength is above a predetermined signal threshold and said signal strength variability is below a predetermined variability threshold.

42. The system of claim 38 wherein each of said reference waveforms has a response start as a function of time, the system further including an alignment processor which shifts said response start to temporally align said reference waveforms, said data storage area storing said temporally aligned reference waveforms.

43. The system of claim 40 wherein the unauthenticated response signal has a measured length and an initial response start as a function of time, said alignment processor temporally shifting said initial response start with respect to said composite mean waveform to temporally align the unauthenticated response signal with said composite mean waveform, said modification processor including the unauthenticated response signal as said additional reference waveform only if said measured length is substantially equal to a measured length of said composite mean waveform and said temporal shifting is below a predetermined shifting threshold.

44. The system of claim 31, further including a modification processor which analyzes said reference waveforms and determines a confidence value for each of said reference waveforms, said modification processor comparing said calculated confidence values to a maximum confidence value and removing a particular reference waveform from said data storage area if said calculated confidence value for said particular reference waveform exceeds said maximum confidence value.

45. The system of claim 44 wherein said maximum confidence value is dependent on a number of said reference waveforms in said data storage area, said maximum confidence value decreasing as said number of reference waveforms in said data storage area increases.

46. A method for the identification of an individual unauthenticated transmitter as an authentic transmitter or an unauthorized transmitter when operating in an environment containing a plurality of similar transmitters, the method comprising the steps of:

storing a plurality of response waveforms designated as reference waveforms for the authentic transmitter in a data storage area;

computing a composite mean waveform from said reference waveforms;

calculating difference values between said reference waveforms and said composite mean waveform;

applying a weighting function to said difference values to generate weighted difference values;

determining a reference variability value based on said weighted difference values, said reference variability value being indicative of the degree of variation of said reference waveforms from said composite mean waveform;

receiving a transmission from the unauthenticated transmitter that can be the authentic transmitter or the unauthorized transmitter, said transmission including a first unauthenticated response signal and identification data identifying the unauthenticated transmitter as the authentic transmitter; and calculating first unauthenticated difference values between said first unauthenticated response signal and said composite mean waveform;

applying said weighting function to said first unauthenticated difference values to generate first unauthenticated weighted difference values;

determining a first unauthenticated variability value based on said first unauthenticated weighted difference values, said first unauthenticated variability value being indicative of the degree of variation of said first unauthenticated response signal from said composite mean waveform; and comparing said first unauthenticated variability value to said reference variability value to determine whether the unauthenticated transmitter is the authentic transmitter or the unauthorized transmitter.

47. The method of claim 46, further including the step of calculating normalized waveforms for each respective reference waveform wherein said step of calculating difference values uses said normalized waveforms and said composite mean waveform.

48. The method of claim 47 wherein said step of computing said reference variability value includes the steps of computing individual reference variability value for each of said normalized waveforms and calculating a statistical measure of said individual reference variability values as said reference variability value.

49. The method of claim 48 wherein said step of calculating said statistical measure includes calculating a mean variability value of said individual reference variability values and a standard deviation of said individual reference variability values as said reference variability value, said step of comparing using said mean variability value and said standard deviation to determine whether said unauthenticated transmitter is the authentic transmitter or the unauthorized transmitter.

50. The method of claim 48 wherein said step of comparing calculates a confidence value indicative of the level of confidence with which said unauthenticated transmitter is identified as the authentic transmitter, said confidence value having the following form:

$$CV = \frac{V_U - \overline{V}}{\sigma_V}$$

where CV is said confidence value, $V_U$ is said first unauthenticated variability value, $\overline{V}$ is a mean variability value of said variability values for said normalized waveforms, and $\sigma_V$ is a standard deviation of said variability values for said individual mean waveforms.

51. The method of claim 50, further including the step of generating an indication that the unauthenticated transmitter is the authentic transmitter if said confidence value is less than or equal to a predetermined threshold.

52. The method of claim 51 wherein said predetermined threshold is between two and three.

53. The method of claim 46 wherein each of said reference waveforms have a response start as a function of time, the method further including the step of shifting said response starts to temporally align said reference waveforms, said data storage area storing said temporally aligned reference waveforms.

54. The method of claim 46 wherein said first unauthenticated response is a transmitter turn-on transient.

55. The method of claim 46 wherein said first unauthenticated response is a transmitter turn-off transient.

56. The method of claim 46 wherein said received transmission includes a second unauthenticated response signal, the method further including the steps of:
calculating second unauthenticated difference values between said second unauthenticated response signal and said composite mean waveform;
applying said weighting function to said second unauthenticated difference values to generate second unauthenticated weighted difference values; and
determining a second unauthenticated variability value based on said second unauthenticated weighted difference values, said second unauthenticated variability value being indicative of the degree of variation of said second unauthenticated response signal from said composite mean waveform, said step of comparing using both said first and second unauthenticated variability values to determine whether said unauthenticated transmitter is the authentic transmitter or the unauthorized transmitter.

57. The method of claim 46 wherein said step of applying said weighting function raises said first unauthenticated difference values to a power greater than one to generate said first unauthenticated weighted difference values.

58. The method of claim 46 wherein said step of applying said weighting function raises said first unauthenticated difference values to a power to a power of 1.2 to generate said first unauthenticated weighted difference values.

59. The method of claim 46, further including the steps of analyzing said first unauthenticated response signal and said reference waveforms and including said first unauthenticated response signal as an additional one of said reference waveforms only if said first unauthenticated response signal has a predefined acceptable characteristic, said step of computing a composite mean waveform computing a new composite mean waveform if said first unauthenticated response signal is included as said additional reference waveform.

60. The method of claim 59 wherein said received transmission from the unauthenticated transmitter has a received signal strength and a signal strength variability, wherein said step of analyzing said first unauthenticated response signal includes the steps of analyzing said received signal strength and said signal strength variability as said predefined characteristic, said step of including said first unauthenticated response as said additional reference waveform including said first unauthenticated response only if said received signal strength is above a predetermined signal threshold and said signal strength variability is below a predetermined variability threshold.

61. The method of claim 59 wherein said first unauthenticated response signal has a measured length and an initial response start as a function of time, the method further including the step of temporally shifting said initial response start with respect to said composite mean waveform to temporally align said first unauthenticated response signal with said composite mean waveform, said step of including said first unauthenticated response signal as said additional reference waveform including said first unauthenticated response signal only if said measured length is substantially equal to a measured length of said composite mean waveform and said temporal shifting is below a predetermined shifting threshold.

62. The method of claim 46, further including the steps of analyzing said reference waveforms to determine a confidence value for each of said reference waveforms, comparing said calculated confidence values to a maximum confidence value, and removing a particular reference waveform from said data storage area if said calculated confidence value for said particular reference waveform exceeds said maximum confidence value, said step of computing a composite waveform computing a new composite waveform if said particular waveform is removed from said data storage area.

63. The method of claim 62 wherein said maximum confidence value is dependent on a number of said reference waveforms in said data storage area, said maximum confidence value decreasing as said number of reference waveforms in said data storage area increases.

64. A method using a receiver system for the authentication of an individual unauthenticated transmitter as an authentic transmitter or an unauthorized transmitter when operating in an environment containing a plurality of similar transmitters, the receiver system including a plurality of stored response signals from the authentic transmitter designated as reference waveforms for the authentic transmitter, a composite mean waveform derived from the reference waveforms, and statistical values related to the performance waveforms and the composite mean waveform, the method comprising the steps of:

receiving a transmission from the unauthenticated transmitter that can be the authentic transmitter or the unauthorized transmitter, said received transmission including a first unauthenticated response signal and identification data identifying the unauthenticated transmitter as the authentic transmitter;

calculating first unauthenticated difference values between said first unauthenticated response signal and the composite mean waveform;

applying a weighting function to said first unauthenticated difference values to generate first unauthenticated weighted difference values;

determining a first unauthenticated variability value based on said first unauthenticated weighted difference values, said first unauthenticated variability value being indicative of the degree of variation of said first unauthenticated response signal from said composite mean waveform; and comparing said first unauthenticated response variability value to the statistical values related to the reference waveforms and the composite mean waveform to determine whether said unauthenticated transmitter is the authentic transmitter or the unauthorized transmitter.

65. The method of claim 64 wherein said step of applying said weighting function raises said first unauthenticated difference values to a power greater than one to generate said first unauthenticated weighted difference values.

66. The method of claim 64 wherein said step of applying said weighting function raises said first unauthenticated difference values to a power to a power of 1.2 to generate said first unauthenticated weighted difference values.

67. The method of claim 64 wherein said statistical values include an individual reference variability value for each of the reference waveforms, a mean variability value of said individual reference variability values, and a standard deviation of said individual reference variability values as said reference variability value, said step of comparing using said mean variability value and said standard deviation to determine whether said unauthenticated transmitter is the authentic transmitter or the unauthorized transmitter.

68. The method of claim 64 wherein the receiver system includes normalized waveforms for each respective reference waveform and the statistical values are related to the normalized waveforms and the composite mean waveform, the method further including the step of computing a first unauthenticated normalized waveform from said first unauthenticated response signal, said step of calculating difference values calculating said difference values between said first unauthenticated normalized waveform and said composite mean waveform, said step of comparing said first unauthenticated response variability value to the statistical values using the statistical values related to the normalized waveforms and the composite mean waveform to determine whether said unauthenticated transmitter is the authentic transmitter or the unauthorized transmitter.

69. The method of claim 68 wherein said step of comparing calculates a confidence value indicative of the level of confidence with which the unauthenticated transmitter is identified as the authentic transmitter, said confidence value having the following form:

$$CV = \frac{V_U - \overline{V}}{\sigma_V}$$

where CV is said confidence value, $V_U$ is said first unauthenticated variability value, $\overline{V}$ is a mean variability value of said variability values for said normalized waveforms, and $\sigma_V$ is a standard deviation of said variability values for said normalized waveforms.

70. The method of claim 69, further including the step of generating an indication that the unauthenticated transmitter is the authentic transmitter if said confidence value is less than or equal to a predetermined threshold.

71. The method of claim 70 wherein said predetermined threshold is between two and three.

72. A method for the development of a reference fingerprint used in the authentication of an individual unauthenticated transmitter as an authentic transmitter or an unauthorized transmitter when operating in an environment containing a plurality of similar transmitters when the unauthenticated transmitter that can be the authentic transmitter or the unauthorized transmitter transmits identification data identifying the unauthenticated transmitter as the authentic transmitter, the transmission including an unauthenticated response signal, the method comprising the steps of:

storing a plurality of response waveforms designated as reference waveforms for the authentic transmitter in a data storage area;

computing a composite mean waveform from said reference waveforms;

calculating difference values between said reference waveforms and said composite mean waveform;

applying a weighting function to said difference values to generate weighted difference values; and determining a reference variability value based on said weighted difference values, said reference variability value being indicative of the degree of variation of said reference waveforms from said composite mean waveform, whereby the unauthenticated response signal is processed to generate an unauthenticated variability value for the unauthenticated response signal and is compared with said reference variability value to determine whether the unauthenticated transmitter is the authentic transmitter or the unauthorized transmitter.

73. The method of claim 72 wherein said step of determining said reference variability value sums each of said weighted values to generate an individual variability value for each of said reference waveforms and generates a statistical measure of said individual variability values as said reference variability value.

74. The method of claim 73 wherein said statistical measure includes a mean variability value of said individual variability values and a standard deviation of said individual variability values, whereby said mean variability value and said standard deviation are to determine whether said unauthenticated transmitter the authentic transmitter or the unauthorized transmitter.

75. The method of claim 73, further including the step of calculating a confidence value indicative of the level of confidence with which the unauthenticated transmitter is identified as the authentic transmitter, said confidence value having the following form:

$$CV = \frac{V_U - \overline{V}}{\sigma_V}$$

where CV is said confidence value, $V_U$ is the unauthenticated response variability value, $\overline{V}$ is a mean variability value of said individual variability values, and $\sigma_V$ is a standard deviation of said individual variability values.

76. The method of claim 75 wherein said comparison processor generates an indication that the unauthenticated transmitter is the authentic transmitter if said confidence value is less than or equal to a predetermined threshold.

77. The method of claim 72 wherein said step of applying said weighting function raises said difference values to a power greater than one to generate said weighted difference values.

78. The method of claim 72, further including the steps of analyzing the unauthenticated response signal and said reference waveforms and including the unauthenticated response signal as an additional one of said reference waveforms only if the unauthenticated response signal has a predefined acceptable characteristic, said step of computing said composite mean waveform computing a new composite mean waveform if the unauthenticated response signal is included as said additional reference waveform.

79. The method of claim 78 wherein the received transmission from the unauthenticated transmitter has a received signal strength and a signal strength variability, said step of analyzing the unauthenticated response signal includes the steps of analyzing said received signal strength and said signal strength variability, said step of including the unauthenticated response as said additional reference waveform including the unauthenticated response only if said received signal strength is above a predetermined signal threshold and said signal strength variability is below a predetermined variability threshold.

80. The method of claim 78 wherein each of said reference waveforms have a response start as a function of time, the method further including the step of shifting said response starts to temporally align said reference waveforms, said data storage area storing said temporally aligned reference waveforms.

81. The method of claim 80 wherein the unauthenticated response signal has a measured length and an initial response start as a function of time, said step of shifting also shifting the unauthenticated response signal with respect to said composite mean waveform to temporally align the unauthenticated response signal with said composite mean waveform, said step of analyzing and including the unauthenticated response signal including the unauthenticated response signal as said additional reference waveform only if said measured length is substantially equal to a measured length of said composite mean waveform and said temporal shifting is below a predetermined shifting threshold.

82. The method of claim 72, further including the steps of analyzing said reference waveforms to determine a confidence value for each of said reference waveforms, comparing said calculated confidence values to a maximum confidence value, and removing a particular reference waveform from said data storage area if said calculated confidence value for said particular reference waveform exceeds said maximum confidence value, said step of computing a composite waveform computing a new composite waveform if said particular waveform is removed from said data storage area.

83. The method of claim 82 wherein said maximum confidence value is dependent on a number of said reference waveforms in said data storage area, said maximum confidence value decreasing as said number of reference waveforms in said data storage area increases.

* * * * *